(12) United States Patent
Bisht et al.

(10) Patent No.: US 9,118,571 B2
(45) Date of Patent: Aug. 25, 2015

(54) METHODS OF OPERATING LOAD BALANCING SWITCHES AND CONTROLLERS USING MATCHING PATTERNS WITH UNRESTRICTED CHARACTERS

(71) Applicant: TELEFONAKTIEBOLAGET L M ERICSSON (PUBL), Stockholm (SE)

(72) Inventors: Ashutosh Bisht, Bangalore (IN); Prashant Anand, Bangalore (IN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 117 days.

(21) Appl. No.: 13/936,745

(22) Filed: Jul. 8, 2013

(65) Prior Publication Data

US 2015/0009830 A1    Jan. 8, 2015

(51) Int. Cl.
*H04L 12/26* (2006.01)
*H04W 72/00* (2009.01)
*H04L 12/803* (2013.01)
*H04L 12/801* (2013.01)
*H04L 12/713* (2013.01)
*H04L 12/717* (2013.01)
*H04L 12/747* (2013.01)
(Continued)

(52) U.S. Cl.
CPC ............ *H04L 47/125* (2013.01); *H04L 45/38* (2013.01); *H04L 45/42* (2013.01); *H04L 45/54* (2013.01); *H04L 45/586* (2013.01); *H04L 45/742* (2013.01); *H04L 45/745* (2013.01); *H04L 47/35* (2013.01)

(58) Field of Classification Search
CPC ............ H04L 67/1002; H04L 67/1008; H04L 69/329; H04L 47/10; H04L 47/70; H04L 61/10; H04L 61/15; H04L 61/20; H04L 61/25; H04W 28/02; H04W 28/0205; H04W 28/021; H04W 28/0226–28/0289; H04W 28/08; H04W 28/10
USPC ............................ 370/229–238.1, 252–253, 370/395.2–395.41; 709/226, 229, 234–235; 455/453
See application file for complete search history.

(56) References Cited

U.S. PATENT DOCUMENTS

| 5,960,431 A | 9/1999 | Choy |
| 6,282,605 B1 | 8/2001 | Moore |
| 6,601,084 B1 | 7/2003 | Bhaskaran et al. |

(Continued)

OTHER PUBLICATIONS

McKeown N. et al. "OpenFlow: Enabling Innovation in Campus Networks", Mar. 14, 2008, the whole document.

(Continued)

*Primary Examiner* — Thai Hoang

(57) ABSTRACT

A load balancing system may include a switch coupled with a plurality of servers and a controller. A flow table may include default flow entries with each default flow entry including a different match pattern. At least one of the default flow entries may include a match pattern with an unrestricted character so that the match pattern having the unrestricted character is satisfied by a plurality of data flow identifications. Each of the default flow entries may include an action to be performed for data packets having data flow identifications that satisfy its match pattern. A data packet including a data flow identification for a data flow may be received from a client device. A default flow entry having a match pattern that is satisfied by the data flow identification is identified, and the data packet is processed in accordance with the action for the identified default flow entry.

23 Claims, 12 Drawing Sheets

(51) Int. Cl.
*H04L 12/741* (2013.01)
*H04L 12/721* (2013.01)

(56) References Cited

U.S. PATENT DOCUMENTS

| | | |
|---|---|---|
| 6,944,678 B2 | 9/2005 | Lu et al. |
| 7,321,926 B1 | 1/2008 | Zhang et al. |
| 7,328,237 B1 | 2/2008 | Thubert et al. |
| 7,647,424 B2 | 1/2010 | Kim et al. |
| 7,653,700 B1 | 1/2010 | Bahl et al. |
| 7,808,897 B1 * | 10/2010 | Mehta et al. .............. 370/230 |
| 7,822,871 B2 | 10/2010 | Stolorz et al. |
| 7,908,605 B1 | 3/2011 | Graupner et al. |
| 8,136,025 B1 | 3/2012 | Zhu et al. |
| 8,547,878 B2 * | 10/2013 | Sundararaman et al. ..... 370/256 |
| 8,929,374 B2 * | 1/2015 | Tonsing et al. .............. 370/392 |
| 2002/0032798 A1 | 3/2002 | Xu |
| 2002/0194342 A1 | 12/2002 | Lu et al. |
| 2002/0194345 A1 | 12/2002 | Lu et al. |
| 2002/0194350 A1 | 12/2002 | Lu et al. |
| 2003/0065762 A1 | 4/2003 | Stolorz et al. |
| 2006/0233106 A1 | 10/2006 | Achlioptas |
| 2006/0288119 A1 | 12/2006 | Kim et al. |
| 2009/0201935 A1 * | 8/2009 | Hass et al. .............. 370/395.32 |
| 2010/0080233 A1 | 4/2010 | Kwapniewski et al. |
| 2011/0145386 A1 | 6/2011 | Stolorz et al. |
| 2011/0185065 A1 | 7/2011 | Stanisic et al. |
| 2011/0191477 A1 | 8/2011 | Zhang et al. |
| 2012/0002546 A1 * | 1/2012 | Sundararaman et al. ..... 370/235 |
| 2012/0020210 A1 * | 1/2012 | Sonnier et al. ............ 370/230.1 |
| 2012/0095974 A1 | 4/2012 | Bentkofsky et al. |
| 2012/0179607 A1 | 7/2012 | Abifaker et al. |
| 2012/0281698 A1 | 11/2012 | Forster et al. |
| 2013/0064088 A1 * | 3/2013 | Yu et al. .................. 370/235 |
| 2013/0136011 A1 * | 5/2013 | Tardo et al. ................ 370/252 |
| 2013/0297798 A1 | 11/2013 | Arisoylu et al. |
| 2014/0108638 A1 | 4/2014 | Ko et al. |

OTHER PUBLICATIONS

Uppal H. et al. "OpenFlow Based Load Balancing", University of Washington CSE651: Networking Project Report, reproduced Jun. 27, 2013, the whole document.

"OpenFlow Switch Specification", Version 1.1.0 Implemented (Wire Protocol 0x02), Feb. 28, 2011, the whole document.

Mori T. et al., "Identifying Elephant Flows Through Periodically Sampled Packets," in *Proceedings of the 4th ACM SIGCOMM conference on Internet measurement* (IMC '04). ACM, New York, NY, USA, Oct. 2004, pp. 115-120.

Ben Fredj S. et al., "Statistical Bandwidth Sharing: A Study of Congestion at Flow Level," in Proceedings of ACM SIGCOMM, pp. 111-122, Aug. 2001.

Mori, T., et al. "On the characteristics of Internet traffic variability: Spikes and Elephants," in Proceedings of IEEE/IPSJ Saint, Tokyo, Japan, Jan. 2004, the whole document.

Papagiannaki K. et al., "On the Feasibility of Identifying Elephants in Internet Backbone Traffic," Sprint ATL Technical Report TR01-ATL-110918, Sprint Labs, Nov. 2001, the whole document.

Thompson K. et al., "Wide-area internet traffic patterns and characteristics," IEEE Network, vol. 11, No. 6, Nov./Dec. 1997, pp. 10-23.

Lu, Y. et al., "ElephantTrap: A low cost device for identifying large flows," High-Performance Interconnects, Symposium on, 15th Annual IEEE Symposium on High-Performance Interconnects (HOTI 2007), 2007, pp. 99-108.

* cited by examiner

Figure 3A

| Flow Table 217a | | | | | |
|---|---|---|---|---|---|
| Flow Entry ID | Match Pattern (MP) | Server ID | Action (A) | Version (V) | Priority (P) |
| FE-1 | MP-FE1 | SID-FE1 | A-FE1 | V-FE1 | P-FE1 |
| FE-2 | MP-FE2 | SID-FE2 | A-FE2 | V-FE2 | P-FE2 |
| *** | *** | *** | *** | *** | *** |
| FE-m | MP-FEm | SID-FEm | A-FEm | V-FEm | P-FEm |

Figure 3B

| Flow Server Mapping Table 235a | | | |
|---|---|---|---|
| Data Flow ID | Match Pattern | Version | Server ID |
| DFID-1 | MP-DFID1 | V-DFID1 | SID-DFID1 |
| DFID-2 | MP-DFID2 | V-DFID2 | SID-DFID2 |
| *** | *** | *** | *** |
| DFID-k | MP-DFIDk | V-DFIDk | SID-DFIDk |

Figure 4

| Flow Entry ID | Match Pattern For IP Source Address (MP) | Server ID | Action (A) | Version (V) | Priority (P) |
|---|---|---|---|---|---|
| FE-1 | X.X.X.1 | SID-1 | S&C | S&C | Low |
| FE-2 | X.X.X.2 | SID-2 | S&C | S&C | Low |
| FE-3 | X.X.X.3 | SID-4 | S&C | S&C | Low |
| FE-4 | X.X.X.4 | SID-4 | S&C | S&C | Low |
| FE-5 | X.X.X.5 | SID-1 | S&C | S&C | Low |
| *** | *** | *** | *** | *** | *** |
| FE-255 | X.X.X.255 | SID-3 | S&C | S&C | Low |

Figure 5

| Data Flow ID | Match Pattern | Version | Server ID |
|---|---|---|---|
| 10.10.10.1 | X.X.X.1 | S&C | SID-1 |
| 10.10.10.2 | X.X.X.2 | S&C | SID-2 |

Figure 6

Flow Table 217a

Sub-Table of Default Flow Entries

| Flow Entry ID | Match Pattern For IP Source Address (MP) | Server ID | Action (A) | Version (V) | Priority (P) |
|---|---|---|---|---|---|
| FE-1 | X.X.X.1 | SID-1 | S&C | S&C | Low |
| FE-2 | X.X.X.2 | SID-2 | S&C | S&C | Low |
| FE-3 | X.X.X.3 | SID-4 | S&C | S&C | Low |
| FE-4 | X.X.X.4 | SID-4 | S&C | S&C | Low |
| FE-5 | X.X.X.5 | SID-1 | S&C | S&C | Low |
| *** | *** | *** | *** | *** | *** |
| FE-255 | X.X.X.255 | SID-3 | S&C | S&C | Low |

Sub-Table of Dedicated Flow Entries

| Flow Entry ID | Match Pattern For IP Source Address (MP) | Server ID | Action (A) | Version (V) | Priority (P) |
|---|---|---|---|---|---|
| DFE-1 | 10.10.10.1 | SID-1 | S | S | High |

Figure 7A

Flow Table 217a

Sub-Table of Default Flow Entries

| Flow Entry ID | Match Pattern For IP Source Address (MP) | Server ID | Action (A) | Version (V) | Priority (P) |
|---|---|---|---|---|---|
| FE-1 | X.X.X.1 | SID-1 | C | C | Low |
| FE-2 | X.X.X.2 | SID-2 | S&C | S&C | Low |
| FE-3 | X.X.X.3 | SID-4 | S&C | S&C | Low |
| FE-4 | X.X.X.4 | SID-4 | S&C | S&C | Low |
| FE-5 | X.X.X.5 | SID-1 | S&C | S&C | Low |
| * * * | * * * | * * * | * * * | * * * | * * * |
| FE-255 | X.X.X.255 | SID-3 | S&C | S&C | Low |

Sub-Table of Dedicated Flow Entries

| Flow Entry ID | Match Pattern For IP Source Address (MP) | Server ID | Action (A) | Version (V) | Priority (P) |
|---|---|---|---|---|---|
| DFE-1 | 10.10.10.1 | SID-1 | S | S | High |

Figure 7B

| Data Flow ID | Match Pattern | Version | Server ID |
|---|---|---|---|
| 10.10.10.1 | 10.10.10.1 | S | SID-1 |
| 10.10.10.2 | X.X.X.2 | S&C | SID-2 |
| 10.10.20.1 | X.X.X.1 | S&C | SID-1 |

Figure 7C

| Flow Table 217a ||||||
|---|---|---|---|---|---|
| Sub-Table of Default Flow Entries ||||||
| Flow Entry ID | Match Pattern For IP Source Address (MP) | Server ID | Action (A) | Version (V) | Priority (P) |
| FE-1 | X.X.X.1 | SID-1 | C | C | Low |
| FE-2 | X.X.X.2 | SID-2 | S&C | S&C | Low |
| * * * | * * * | * * * | * * * | * * * | * * * |
| FE-255 | X.X.X.255 | SID-3 | S&C | S&C | Low |
| Sub-Table of Dedicated Flow Entries ||||||
| Flow Entry ID | Match Pattern For IP Source Address (MP) | Server ID | Action (A) | Version (V) | Priority (P) |
| DFE-1 | 10.10.10.1 | SID-1 | S | S | High |
| DFE-2 | 10.10.20.1 | SID-1 | S | S | High |

Figure 7D

| Data Flow ID | Match Pattern | Version | Server ID |
|---|---|---|---|
| 10.10.10.1 | 10.10.10.1 | S | SID-1 |
| 10.10.10.2 | X.X.X.2 | S&C | SID-2 |
| 10.10.20.1 | 10.10.20.1 | S | SID-1 |

Figure 7E

| Flow Table 217a | | | | | |
|---|---|---|---|---|---|
| Sub-Table of Default Flow Entries | | | | | |
| Flow Entry ID | Match Pattern For IP Source Address (MP) | Server ID | Action (A) | Version (V) | Priority (P) |
| FE-1 | X.X.X.1 | SID-1 | C | C | Low |
| FE-2 | X.X.X.2 | SID-2 | S&C | S&C | Low |
| *** | *** | *** | *** | *** | *** |
| FE-255 | X.X.X.255 | SID-3 | S&C | S&C | Low |
| Sub-Table of Dedicated Flow Entries | | | | | |
| Flow Entry ID | Match Pattern For IP Source Address (MP) | Server ID | Action (A) | Version (V) | Priority (P) |
| DFE-1 | 10.10.10.1 | SID-1 | S | S | High |
| DFE-2 | 10.10.20.1 | SID-1 | S | S | High |

Figure 8

| | Data Flow Status In Flow Server Mapping Table (FSMT) | |
|---|---|---|
| Version Informaion | Data Flow Exists in FSMT | Data Flow Does Not Exist in FSMT |
| S&C Server & Controller (to SID-1) | No further action | (1) Install data flow in flow server mapping table 235a; and (2) Install dedicated flow entry in switch for old server (e.g.., 521-1). |
| C Controller | Send the packet to the server indicated in the FSMT | (1) Install data flow in flow server mapping table 235a; (2) install dedicated flow entry in switch for new server (e.g., 521-2); and (3) Send the data packet to the new server (e.g., 521-2) |

Figure 9

| Flow Table 217a | | | | | |
|---|---|---|---|---|---|
| Sub-Table of Default Flow Entries | | | | | |
| Flow Entry ID | Match Pattern For IP Source Address (MP) | Server ID | Action (A) | Version (V) | Priority (P) |
| FE-1 | X.X.X.1 | SID-2 | S&C | S&C | Low |
| FE-2 | X.X.X.2 | SID-2 | S&C | S&C | Low |
| * * * | * * * | * * * | * * * | * * * | * * * |
| FE-255 | X.X.X.255 | SID-3 | S&C | S&C | Low |
| Sub-Table of Dedicated Flow Entries | | | | | |
| Flow Entry ID | Match Pattern For IP Source Address (MP) | Server ID | Action (A) | Version (V) | Priority (P) |
| DFE-1 | 10.10.10.1 | SID-1 | S | S | High |
| DFE-2 | 10.10.20.1 | SID-1 | S | S | High |

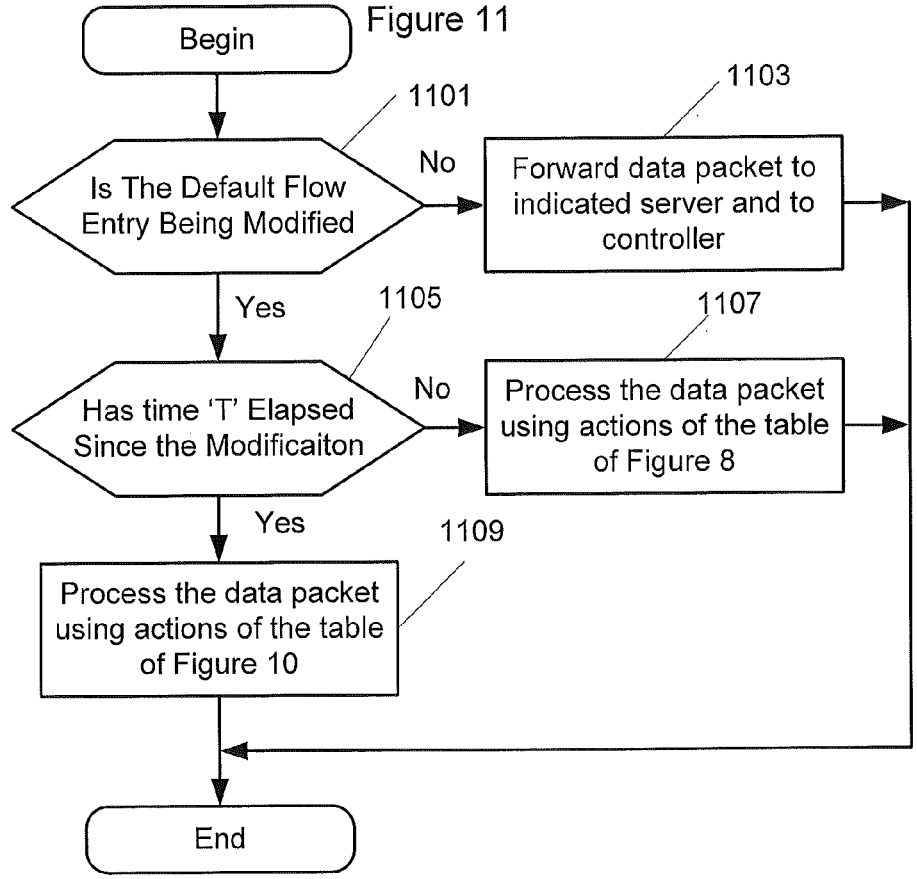

METHODS OF OPERATING LOAD BALANCING SWITCHES AND CONTROLLERS USING MATCHING PATTERNS WITH UNRESTRICTED CHARACTERS

TECHNICAL FIELD

The present disclosure is directed to data networks and, more particularly, to data network load balancing and related methods, controllers, and switches.

BACKGROUND

In today's high-traffic internet, it may be desirable to have multiple servers representing a single logical destination server to share load. A typical configuration may include multiple servers behind a load-balancer to determine which server will service a client's request. Such hardware may be expensive, may have a rigid policy set, and may be a single point of failure. An alternative load-balancing architecture, using an OpenFlow switch connected to an OpenFlow controller (such as a NOX controller), may provide increased flexibility in policy, reduced costs, and/or potential to be more robust to failure with future generations of switches. OpenFlow architectures are discussed, for example, by: Uppal, Hardee et al., "OpenFlow Based Load Balancing," University of Washington, http://people.cs.umass.edu/~hardeep/cse561_openflow_project_report.pdf, 7 pages, reproduced Jun. 27, 2013; McKeown, Nick et al., "OpenFlow: Enabling Innovation in Campus Networks," http://sb.tmit.bme.hu/sonkoly/files/openflow/openflow-wp-latest.pdf, 6 pages, Mar. 14, 2008; and "OpenFlow Switch Specification," Version 1.1.0 Implemented (Wire Protocol 0x02), 56 pages, Feb. 28, 2011. The disclosures of all of the above referenced documents are hereby incorporated herein in their entireties by reference.

An OpenFlow switch (also referred to as a switch) is similar to a standard hardware switch with a flow table used to perform packet lookup and forwarding. The difference lies in how flow rules are inserted and updated inside the switch's flow table. A standard switch can have static rules inserted into the switch or can be a learning switch where the switch inserts rules into its flow table as it learns on which interface (switch port) a machine is. In contrast, an OpenFlow switch uses an external OpenFlow controller (also referred to as a controller) to add rules into its flow table.

An OpenFlow controller is an external controller (external to the switch) that is responsible for adding and/or removing new rules into the OpenFlow switch's flow table. The OpenFlow switch is connected to the controller and communicates over a secure channel using the OpenFlow protocol. Current designs of OpenFlow may only allow one controller per switch. In current load balancer designs using OpenFlow, controller decides how packets of a new flow should be handled by the switch. When new flows arrive at the switch, the packet is redirected to the controller which then decides whether the switch should drop the packet or forward it to a machine connected to the switch. The controller can also delete or modify existing flow entries in the switch.

The controller can execute modules that describe how a new flow should be handled. This may provide an interface to write C++ modules that dynamically add or delete routing rules into the switch and can use different policies for handling flows.

A flow table entry of an OpenFlow switch includes header fields, counters, and actions. Each flow table entry stores Ethernet, IP and TCP/UDP header information. This information includes destination/source MAC and IP address and source/destination TCP/UDP port numbers. Each flow table entry also maintains a counter of numbers of packets and bytes arrived per flow. A flow table entry can also have one or more action fields that describe how the switch will handle packets that match the flow entry. Some of the actions include sending the packet on all output ports, forwarding the packet on an output port of a particular machine and modifying packet headers (Ethernet, IP and TCP/UDP header). If a flow entry does not have any actions, then by default, the switch drops all packets for the particular flow.

Each Flow entry may also have an expiration time after which the flow entry is deleted from the flow table. This expiration time is based on the number of seconds a flow was idle and the total amount the time (in seconds) the flow entry has been in the flow table. The controller can chose a flow entry to exist permanently in the flow table or can set timers which delete the flow entry when the timer expires.

Because an OpenFlow controller is external to (i.e., separate and/or remote from) an associated OpenFlow switch, delay/latency may result for communications between the controller and switch, thereby delaying transfer of data packets to the intended servers.

SUMMARY

It may therefore be an object to address at least some of the above mentioned disadvantages and/or to improve network performance. According to some embodiments, for example, a volume of communications traffic between a load balancing switch and controller may be reduced and/or delay transmitting data packets to servers may be reduced.

According to some embodiments, methods may be provided to operate a switch coupled with a plurality of servers and a controller in a load balancing system. A flow table may be provided including a plurality of default flow entries wherein each of the plurality of default flow entries includes a respective match pattern with each of the match patterns of the plurality of default flow entries being different. At least one of the plurality of default flow entries may include a respective match pattern having at least one unrestricted character so that the match pattern having the unrestricted character is satisfied by a plurality of data flow identifications. Each of the plurality of default flow entries may include an action to be performed for data packets having data flow identifications that satisfy the respective match pattern. A data packet for a data flow may be from a client device wherein the data packet includes a data flow identification for the data flow, and a default flow entry of the plurality of default flow entries may be identified having a match pattern that is satisfied by the data flow identification. The data packet for the data flow may be processed in accordance with the action for the default flow entry having the match pattern that is satisfied by the data flow identification.

By providing default flow entries for the switch flow table, the switch may be able to transmit first data packets of new data flows to respective appropriate servers without first informing a controller and waiting for a response. Moreover, use of an unrestricted (e.g., wildcard) character(s) in match patterns for at least some of the default flow entries may allow a relatively small number of default flow entries to provide at least initial processing for most (if not all) data flows that will be received at the switch.

The match pattern that is satisfied by the data flow identification may include an unrestricted character, and the data packet for the data flow may be a first data packet for the data flow. After processing the first data packet for the data flow, a dedicated flow entry for the data flow may be installed in the flow table, wherein the dedicated flow entry includes a match pattern that is specific to the data flow identification of the data flow. After installing the dedicated flow entry for the data flow, a second data packet for the data flow may be received from the client device wherein the second data packet for the data flow includes the data flow identification for the data flow. The dedicated flow entry having the match pattern that is specific to the data flow identification of the data flow may be identified, and the second data packet of the data flow may be processed in accordance with the action for the dedicated flow entry including the match pattern that is specific to the data flow identification for the data flow.

Dedicated flow entries may thus be provided, for example, for relatively high traffic data flows after using a default data flow to initially process the data flow. Accordingly, initial data packets of such a data flow may be processed without significant delay using a respective default data flow, and the respective dedicated data flow may be installed later once the need is apparent for the data flow (e.g., once a threshold volume of traffic for the data flow has been exceeded). Dedicated flow entries may also be used to support previously established data flows (directed to an old server) during/after modification of a default flow entry to point to a new server.

The data flow may be a first data flow, the data flow identification may be a first data flow identification, and the client device may be a first client device. After processing the second data packet, a data packet for a second data flow may be received from a second client device wherein the data packet for the second data flow includes a second data flow identification for the second data flow, wherein the first and second data flow identifications are different, and wherein the match pattern of the default flow entry is satisfied by the first and second data flow identifications. The default flow entry of the plurality of default flow entries having the match pattern that is satisfied by the first and second data flow identifications may be identified, and the data packet for the second data flow may be processed in accordance with the action for the default flow entry having the match pattern that is satisfied by the first and second data flow identifications.

The action for the default flow entry with the match pattern that is satisfied by the first and second data flow identifications may be to transmit matching data packets to one of the plurality of servers that is identified by the default flow entry, and the action for the dedicated flow entry may be to transmit matching data packets to the one of the plurality of servers identified by the dedicated flow entry. Processing the first data packet of the first data flow may include transmitting the first data packet of the first data flow to the server identified by the default flow entry according to the action for the default flow entry. Processing the second data packet of the first data flow may include transmitting the second data packet of the first data flow to the server identified by the dedicated flow entry according to the action for the dedicated flow entry. Processing the data packet of the second data flow may include transmitting the data packet of the second data flow to the server identified by the default flow entry according to the action for the default flow entry.

The default flow entry and the dedicated flow entry may identify the same server so that the first and second data packets of the first data flow and the data packet of the second data flow are transmitted to the same server.

Processing the first data packet of the first data flow may further include transmitting at least the first data flow identification to the controller, processing the second data packet of the first data flow may include transmitting the second data packet to the server without transmitting the first data flow identification to the controller, and processing the data packet for the second data flow may include transmitting at least the second data flow identification to the controller.

The action for the default flow entry may be to transmit data packets to a server identified by the default flow entry and to transmit at least a data flow identification to the controller, and processing the data packet for the data flow may include transmitting the data packet to the server identified by the default flow entry and transmitting at least the data flow identification for the data flow to the controller.

The data packet for the data flow may be a first data packet for the data flow. After processing the first data packet for the data flow, the default flow entry may be modified so that the action for the default flow entry is to transmit at least a data flow identification to the controller without transmitting a data packet to a server. After modifying the default flow entry, a second data packet for the data flow may be received from the client device wherein the second data packet for the data flow includes the data flow identification for the data flow. The default flow entry of the plurality of default flow entries having the match pattern that is satisfied by the data flow identification may be identified, and at least the data flow identification from the second data packet of the data flow may be transmitted to the controller without transmitting the data packet to a server.

The data flow may be a first data flow, the data flow identification may be a first data flow identification, the client device may be a first client device, and the server identified by the default flow entry may be a first server identified by the default flow entry. After transmitting at least the data flow identification from the second data packet, the default flow entry may be modified to identify a second server different than the first server so that the action for the default flow entry is to transmit data packets to the second server identified by the default flow entry and to transmit at least a data flow identification to the controller. After modifying the default flow entry to identify the second server, a data packet for a second data flow may be received including a second data flow identification for the second data flow, wherein the first and second data flow identifications are different, and wherein the match pattern of the default flow entry is satisfied by the first and second data flow identifications. The default flow entry of the plurality of default flow entries having the match pattern that is satisfied by the first and second data flow identification may be identified, and the data packet of the second data flow may be processed in accordance with the action for the default flow entry so that the data packet is transmitted to the second server and so that at least the second data flow identification is transmitted to the controller.

Processing the data packet of the second data flow may further include transmitting an indication to the controller that the data packet of the second data flow was transmitted by the switch to the second server.

Processing the data packet of the data flow may include transmitting the data packet of the data flow to a server identified by the default flow entry.

Processing the data packet of the data flow may further include transmitting at least the data flow identification to the controller.

The data flow identification may include an Internet Protocol (IP) source address.

According to some other embodiments, a load balancing switch may include a controller interface configured to provide communications with a load balancing controller, a server interface configured to provide communications with a plurality of servers, a network interface configured to provide communications with a plurality of client devices over a network, a memory, and a switch processor coupled to the controller interface, the server interface, the network interface, and the memory. The memory may be configured to provide a flow table including a plurality of default flow entries wherein each of the plurality of default flow entries includes a respective match pattern with each of the match patterns of the plurality of default flow entries being different and wherein at least one of the plurality of default flow entries includes a respective match pattern having at least one unrestricted character so that the match pattern having the unrestricted character is satisfied by a plurality of data flow identifications, and wherein each of the plurality of default flow entries includes an action to be performed for data packets with data flow identifications that satisfy the respective match pattern. The switch processor may be configured to receive a data packet for a data flow from a client device through network interface wherein the data packet includes a data flow identification for the data flow, to identify a default flow entry of the plurality of default flow entries having a match pattern that is satisfied by the data flow identification, and to process the data packet for the data flow in accordance with the action for the default flow entry having the match pattern that is satisfied by the data flow identification. The action may include at least one of transmitting the data packet through the server interface to one of the plurality of servers identified by the default flow entry and/or transmitting at least the data flow identification through the controller interface to the controller.

According to still other embodiments, a method may be provided to operate a controller coupled with a switch in a load balancing system, wherein the switch provides a flow table to define processing for received data packets. At least one instruction may be transmitted to install a plurality of default flow entries in the flow table at the switch wherein each of the plurality of default flow entries includes a respective match pattern with each of the match patterns of the plurality of default flow entries being different and wherein at least one of the plurality of default flow entries includes a respective match pattern having at least one unrestricted character so that the match pattern having the unrestricted character is satisfied by a plurality of data flow identifications, and wherein each of the plurality of default flow entries includes an action to be performed for data packets having data flow identifications that satisfy the respective match pattern. A data flow identification may be received from the switch together with an indication that an associated data packet was transmitted by the switch to a server, an identification of the server, and an identification of the default flow entry used to process the data packet. An entry for the data flow may be added to a flow server mapping table so that the entry for the data flow includes the data flow identification, the identification of the server, and the match pattern of the default flow entry.

The default flow entry used to process the data packet may include an unrestricted character, and the data flow identification may be a first data flow identification. After receiving the first data flow identification and adding the entry for the data flow to the flow server mapping table, an instruction may be transmitted to install a dedicated flow entry for the data flow in the flow table at the switch, wherein the dedicated flow entry includes a match pattern that is specific to the data flow identification of the data flow and the identification of the server.

The dedicated flow entry may include an indication to transmit matching data packets to the server without transmitting the data flow identification to the controller.

After receiving the first data flow identification and adding the entry for the data flow to the flow server mapping table, an instruction may be transmitted to modify the default flow entry to transmit data flow identifications for matching data packets to the controller without transmitting matching data packets to a server while maintaining a first server identification for the default flow entry.

After transmitting the instruction to install the dedicated flow entry for the data flow and after transmitting the instruction to modify the default flow entry, the data flow identification may be received from the switch together with an indication that an associated data packet was not transmitted by the switch to a server. Transmission of the associated data packet to the server may be initiated responsive to the entry for the data flow corresponding to the data flow identification being included in the flow server mapping table.

The data flow identification may be a first data flow identification. After transmitting the instruction to install the dedicated flow entry for the data flow and after transmitting the instruction to modify the default flow entry, a second data flow identification may be received from the switch together with an indication that an associated data packet was not transmitted by the switch to a server, with the first and second data flow identifications being different. Responsive to the second data flow being omitted from the flow server mapping table, an entry for the second data flow may be added to the flow server mapping table so that the entry for the second data flow includes the second data flow identification, the identification of the server, and the match pattern of the default flow entry. An instruction may be transmitted to install a second dedicated flow entry for the second data flow in the flow table at the switch, wherein the second dedicated flow entry includes a match pattern that is specific to the second data flow identification of the second data flow and the identification of the server. Transmission of the associated data packet to the server may be initiated responsive to the entry for the data flow corresponding to the data flow identification being included in the flow server mapping table.

The data flow identification may be a first data flow identification. After transmitting the instruction to install the dedicated flow entry for the data flow and after transmitting the instruction to modify the default flow entry, a second data flow identification may be received from the switch together with an indication that an associated data packet was transmitted by the switch to a server, wherein the first and second data flow identifications are different. Responsive to the second data flow being omitted from the flow server mapping table, an entry for the second data flow may be added to the flow server mapping table so that the entry for the second data flow includes the second data flow identification, the identification of the server, and the match pattern of the default flow entry. An instruction may be transmitted to install a second dedicated flow entry for the second data flow in the flow table at the switch, wherein the second dedicated flow entry includes a match pattern that is specific to the second data flow identification of the second data flow and the identification of the server.

The instruction to modify the default flow entry may be a first instruction to modify the default flow entry. After transmitting the first instruction to modify the default flow entry, a second instruction may be transmitted to modify the default flow entry to provide a second server identification for a second server different than the first server identification and to transmit matching data packets to the second server and to transmit a data flow identification for the matching data packets to the controller.

According to still other embodiments, a load balancing controller may include a switch interface configured to provide communications with a load balancing switch including a flow table to define processing for received data packets, a memory configured to provide a flow server mapping table; and a processor coupled to the switch interface and the memory. The processor may be configured to transmit at least one instruction through the switch interface to install a plurality of default flow entries in the flow table at the switch wherein each of the plurality of default flow entries includes a respective match pattern with each of the match patterns of the plurality of default flow entries being different and wherein at least one of the plurality of default flow entries includes a respective match pattern having at least one unrestricted character so that the match pattern having the unrestricted character is satisfied by a plurality of data flow identifications, and wherein each of the plurality of default flow entries includes an action to be performed for data packets having data flow identifications that satisfy the respective match pattern. The processor may be further configured to receive a data flow identification from the switch together with an indication that an associated data packet was transmitted by the switch to a server, an identification of the server, and an identification of the default flow entry used to process the data packet. The processor may also be configured to add an entry for the data flow to a flow server mapping table so that the entry for the data flow includes the data flow identification, the identification of the server, and the match pattern of the default flow entry.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings:

FIG. 3A is diagram illustrating a flow table of a switch of FIG. 2 according to some embodiments;

FIG. 3B is a diagram illustrating a flow server mapping table of a controller of FIG. 2 according to some embodiments;

FIG. 4 is a diagram illustrating a flow table of FIG. 3A of a switch of including default flow entries according to some embodiments;

FIG. 5 is a diagram illustrating a flow server mapping table of FIG. 3B including two data flows according to some embodiments;

FIG. 6 is a diagram illustrating a flow table of FIG. 3A including sub-tables of default and dedicated flow entries according to some embodiments;

FIGS. 7A, 7C, 7E, and 9 are diagrams illustrating modifications of the flow table of FIG. 6 to support transient mode operation of a flow entry according to some embodiments;

FIGS. 7B and 7D are diagrams illustrating modifications of the flow server mapping table of FIG. 5 to support transient mode operation of a flow entry according to some embodiments;

FIGS. 8 and 10 are tables illustrating controller operations supporting transient mode operation of a flow entry according to some embodiment;

FIG. 11 is a flow chart illustrating controller transient mode operations according to some embodiments;

DETAILED DESCRIPTION

Figure 1:
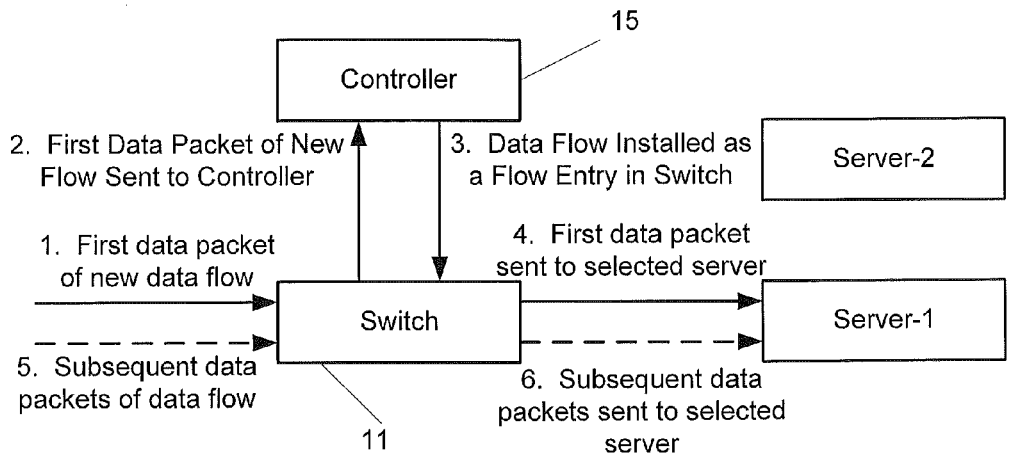
FIG. 1 is a block diagram illustrating conventional processing of first and subsequent data packets of a data flow using a load balancing system including a switch and a controller.

Embodiments of present inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. It should also be noted that these embodiments are not mutually exclusive. Components from one embodiment may be tacitly assumed to be present/used in one or more other embodiments. According to embodiments disclosed herein, a blade may be interpreted/implemented as a server and/or a server may be interpreted/implemented as a blade.

With advent of Software Defined Networking (SDN), applications are being created that make use of this newer way to design networks.

In an SDN paradigm, the control plane is separated from the data plane. The control plane module/element is referred to as a controller, and the data plane module/element is referred to as a switch. The controller and the switch may typically be provided in/as separate machines (e.g., machines/devices that are remote from each other). Accordingly, communication between controller and switch may have non-trivial latency, which may be different from previous architectural approaches where the control plane and data plane are co-located even if they are separate.

In a naive server load balancing application using an SDN paradigm, the controller installs entries in a flow table at the switch that associate various data flows with respective servers, and the controller is separated out from the switch by design, usually on a different machine/device that is remote from the switch. Such a design, however, may cause the following problems:

1) If for every new flow, the controller chooses the server that should handle the new flow, then latency may be introduced during flow setup towards the chosen server because the controller may be a physical entity that is separate from the switch; and
2) If the controller is not involved in choosing the server that should handle a new flow, then the switch may have to make such decisions, but the switch may be unable to provide sufficiently granular, dynamic load distribution of flows among servers.

A switch may be unable to provide sufficiently granular, dynamic load balancing because a switch may have limited storage, and a switch may thus be unable to maintain states of all granular flows. A flow state may be required to ensure that existing flows are not disturbed by dynamic load distribution.

Moreover, in OpenFlow based architectures, flow entries may be installed by the controller (and not by the switch). In this situation, the switch may only be able to do static load distribution among servers.

Dynamic load distribution of flows may be an integral function of load-balancers. Such re-distribution may be necessitated by changing external conditions, such as, addition or removal of servers. Without the controller, only a rudimentary level of static load distribution may be performed by a switch. Load distribution is discussed, for example in: U.S. application Ser. No. 13/919,375 filed Jun.

17, 2013; U.S. application Ser. No. 13/919,411 filed Jun. 17, 2013; and U.S. application Ser. No. 13/919,388 filed Jun. 17, 2013. The disclosures of all of the above referenced applications are hereby incorporated herein in their entireties by reference.

Accordingly, if dynamic distribution of flows to servers is required, then latency may be introduced during flow setup towards a chosen server. If flow setup towards the chosen server is to be done without introducing latency, then only static/rudimentary load balancing may be performed.

Load balancers are typically used to support server load sharing. In order to share load, a load balancer directs incoming new flows to one of the servers at the load balancing system.

A server can be selected for each new flow using diverse methods such as round-robin selection, random selection, weighted random selection, etc.

Once a server is selected for a new data flow, the flow is sent to the selected server so that all subsequent data packets of the data flow are sent to same selected server. To provide that all data packets of each data flow are sent to the respective server for that data flow, the load balancer may maintain data flow to server mappings that are stored in a table referred to as a flow table.

Load balancer functionality can thus be split in two modules: (1) a controller that assigns each new incoming flow to a respective server; and (2) a switch that maintains a flow table with the flow-to-server mappings.

With the Openflow protocol, load-balancers can be built using Openflow switches. One such solution is described in the reference by Uppal, Hardeep et al. entitled "OpenFlow Based Load Balancing" (http://people.cs.umass.edu/~hardeep/cse561_openflow_project_report.pdf, reproduced Jun. 27, 2013), the disclosure of which is hereby incorporated herein in its entirety by reference. An example of handling a new flow is illustrated in FIG. 1 with solid lines indicating handling of a first data packet for a new data flow and dashed lines indicating handling of subsequent data packets of the data flow. As shown in FIG. 1: (1) when a first data packet for a new incoming flow is received at the openflow switch 11, (2) the first data packet of the new incoming data flow is sent from the switch to the openflow controller 15, (3) the openflow controller 15 installs the data flow details (including the assigned server) as a flow entry in a flow table of the openflow switch 11, and (4) the first data packet of the new flow is sent to the server (Server-1) assigned (by the controller 15) for the data flow as set forth in the flow entry. As indicated by dashed lines: (5) when subsequent data packets of the data flow are received at the switch 11; (6) the subsequent data packets are sent to the assigned server (server-1) using the flow table (with the installed flow entry) without intervention of controller 15. Stated in other words, header information (e.g., addressing information) of the subsequent data packets match a match pattern of the flow entry allowing switch 11 to identify data packets belonging to the data flow for the flow entry and to process these data packets using the associated flow entry.

With the load balancer design of FIG. 1, latency of flow setup (to server) may be increased because the first data packet of the data flow is sent to OpenFlow controller 15. Since openflow controller 15 and openflow switch 11 may be implemented on/using separate/remote machines/devices, the sending of the first packet to openflow controller 15 at operation (2) and installing the data flow at operation (3) may introduce significant latency in flow setup.

Figure 2:
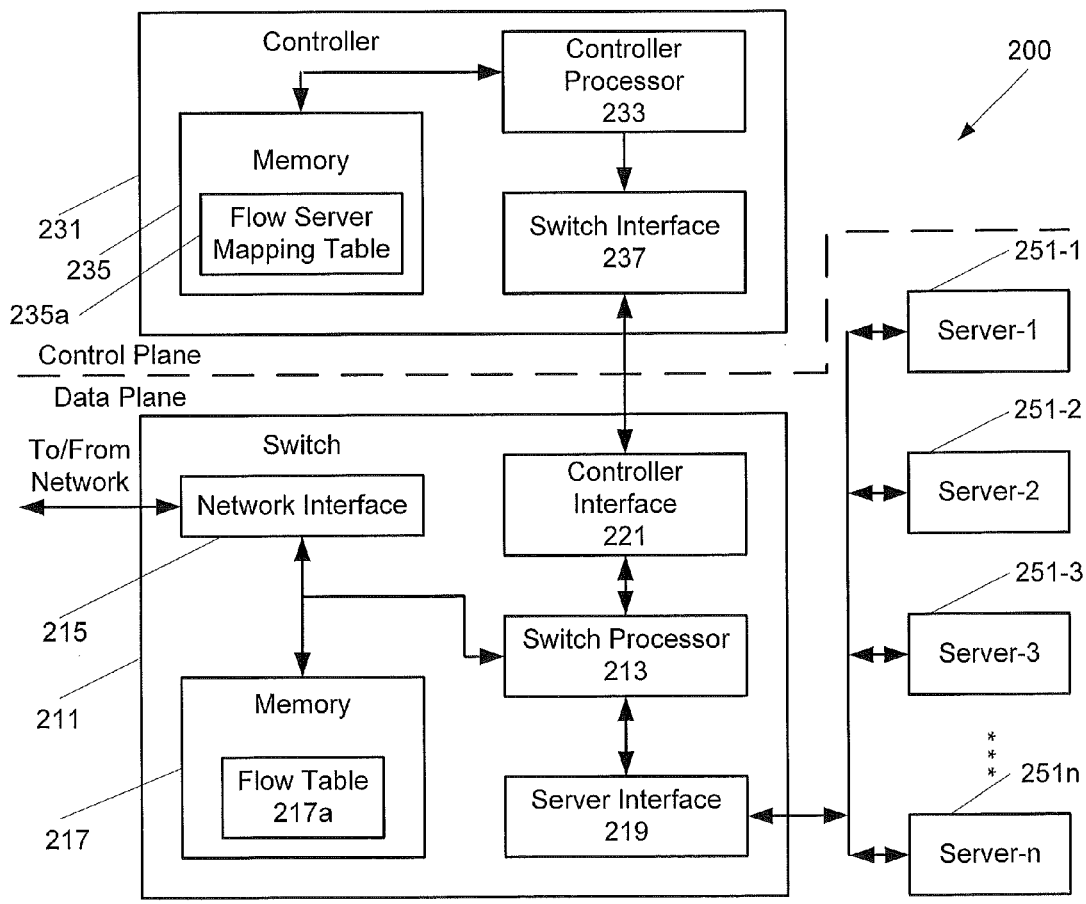
FIG. 2 is a block diagram of a load balancing system including a switch, a controller, and a plurality of servers according to some embodiments.

According to some embodiments of inventive concepts illustrated in FIG. 2, a load balancing system 200 may include a switch 211, a controller 231, and a plurality of servers 251-1, 251-2, 251-3, . . . 251n. Switch 211 may include switch processor 213 coupled to controller interface 221, server interface 219, network interface 215, and memory 217. Network interface 215 may provide a communications interface to client devices through a network or networks, such as one or more of the Internet, a local area network(s), a wide area network(s), etc. Controller interface 221 may provide a communications interface to controller 231 (for example using an OpenFlow channel), and server interface 219 may provide a communications interface to servers 251 of the load balancing system 200. Controller 231 may include controller processor 233 coupled to switch interface 237 and memory 235. Switch interface 237 may provide a communications interface with switch 211 (for example using an OpenFlow channel). As indicated by the dashed line, switch 211 may reside in a data plane of the load balancing system 200, and controller 231 may reside in a control plane of load balancing system 200. Moreover, switch 211 and controller 231 may be provided on separate machines/devices that may be physically remote from each other (e.g., provided on different circuit boards, on different racks of a chassis, in different enclosures, in different rooms, in different buildings, etc.).

Latency may be reduced as discussed below using initialization mode operations, stable mode operations, and transient mode operations. For initialization mode operations, controller 231 sets up default flow entries in flow table 217a stored in memory 217 of switch 211. For stable mode operations, switch 211 sends data packets to servers 251 without intervention of controller 211 as a normal operating mode using flow entries of flow table 217a. For transient mode operations, switch 211 sends some of the data packets to servers 215 only after intervention of controller 231. Transient mode operations may be used when load is being redistributed among servers 251.

For initialization mode operations, controller 231 installs a limited number of pre-configured or default flow entries in the flow table 217a of switch 211. These default/pre-configured flow entries may have following characteristics: for any data flow, one and only one of the default/pre-configured flow entries will match; and each default/pre-configured flow entry is associated with only one server 251. In addition, each default/pre-configured flow entry may include a version field. When a data packet is sent to controller 231, the version field (or similar information indicating the processing of the data packet) may also be sent along with the data packet. According to some embodiments, the version field may include information (either embedded or via indirection) about flow entry action including the server identity and/or the controller identity to which the data packet being sent. Stated in other words, the version field or related information may be sent with the data packet to controller 231 to indicate if the data packet is being sent to controller 231 and also to an associated server, or if the data packet is being sent only to the controller. See operations 1201, 1203, 1301, and 1303 of FIGS. 12 and 13A.

Flow entries that are installed during initialization mode operations may be referred to as default or default/pre-provisioned flow entries. A proportion of data flows that are directed to a particular server 251 may be dependent on a number of default/pre-provisioned flow entries that point to the particular server.

Initially, for the default/pre-provisioned flow entries, (a) the action for each default/pre-provisioned flow entry is to send matching data packets to the associated server 251 and to controller 231, and (b) the version field (or related information) may include information about the associated server 251 and controller 231 (e.g., an identification of the associated server 251 and an identification of controller 231). According to some embodiments, the version field and/or version information transmitted to controller 231 may include only information specifying whether the data packet has been transmitted to a server, and if so, an identification of the server. The controller will know that it has received information for the packet.

For stable mode operations, data packets matching respective default/pre-provisioned flow entries are sent to the associated server (unless the data packet matches a more specific higher priority flow entry, also referred to as a dedicated flow entry). According to some embodiments, for stable mode operations, data packets matching only default/pre-provisioned flow entries are also sent to controller 231 to allow controller 231 to keep track of data flows encountered/processed by switch 211 without incurring significant latency overhead in sending packets to the associated server 251. There may be no timing/delay requirement on sending data packets to controller 231, and arbitrary delay may be allowed in sending each data packet to controller 231 once the same has been sent to the associated server. See operations 1211 and 1215 of FIG. 12.

Although, for stable mode operations, switch 211 may send the data traffic to servers 251 without intervention of controller 231, switch 211 also replicates the data traffic to controller 231. This replication of data packets may result in all traffic handled by switch 211 being sent to controller 231 as well. To reduce this traffic, controller 231 may install some additional dedicated flow entries in switch 211 flow table 217a (while maintaining an existing data flow to server mapping based on a flow server mapping table).

According to some embodiments of inventive concepts, for stable mode operations, controller 231 may install a relatively few additional dedicated flow entries in flow table 217a at switch 211 to reduce data traffic to controller 231 (with the dedicated flow entries having higher priority than the default/pre-configured flow entries). Incoming data packets that match these additional dedicated flow entries are not replicated (transmitted) to controller 231 thereby allowing controller 231 to make a trade-off between a number of flow entries installed in flow table 217a at switch 211 and an amount of data traffic sent to controller 231. No specific number/percentage of these additional dedicated flow entries that need to be installed by controller 231 may be mandated. See operations 1217, 1219, 1315, and 1317 of FIGS. 12 and 13A.

According to some embodiments, the additional dedicated flow entries may be installed responsive to controller 231 detecting relatively large data flows (e.g., elephant data flows). Stated in other words, upon detecting that a particular data flow exceeds a threshold volume of data, controller 231 may install an additional dedicated flow entry in flow table 217a that is specific to that particular data flow, and the additional dedicated flow entry may dictate that data packets of the particular data flow are forwarded to the associated server 251 but not to controller 231. There is no timing/delay requirement on installing the additional dedicated flow entries in switch 211 once the data flow has been setup, thereby allowing for arbitrary delay in setting up these additional dedicated flow entries in flow table 217a at switch 211.

For transient mode operations, controller 231 may modify the server associated with a default/pre-provisioned flow entry without affecting existing flows, thereby allowing dynamic re-distribution of load among servers.

For transient mode operations, to modify a default/pre-provisioned entry to point to a new server, the following operations may be taken in sequence:

1. Controller 231 may modify the action of the default/pre-provisioned entry in flow table 217a to send traffic only to controller 231 (designated as "C" in illustrated flow entries) instead of sending it directly to an associated server 251. Controller 231 may also update the version of default/pre-provisioned flow entry to "Controller only" (designated as "C" in illustrated flow entries). For each data packet reaching controller 231 with the version as "Controller only" or "C", controller 231 sends the data packet to the new or old server associated with the default/pre-configured flow entry in transition. This operation may provide that controller 231 (that maintains the flow server mapping table 235a for all data flows) makes the decision (whether to send a data packet to a new or old server associated with a default/pre-configured flow entry) while the flow entry is in transition, after which new data flows are sent to the new server associated with the default/pre-provisioned flow entry. Ensuring that the decision point (of switching to the new server) and flow state information are co-located and managed by single entity (i.e., managed by controller 231) may make the synchronization between network elements less complicated. See operations 1349 of FIG. 13B.

2. Controller 231 installs additional dedicated flow entries in switch flow table 217a for all existing flows that match the previous version of default/pre-provisioned flow entry. The existing data flows of the default/pre-provisioned flow entry may be identified based on flow server mapping table 235a of controller memory 235 that is generated by controller 231 during stable mode operations. These additional dedicated flow entries may provide that existing data flows are not affected due to modification of a default/pre-provisioned flow entry. See operation 1351 of FIG. 13B.

3. The load balancing system 200 may continue transient mode operations for some time, for example, T seconds. The grace time of 'T' seconds may provide that additional dedicated flow entries are installed for all flows for which a server decision was made at switch 211 (based on a server associated with the previous version of the default/pre-provisioned flow entry). See operations 1353 to 1371 of FIG. 13B.

4. After 'T' seconds have elapsed, controller 231 may modify the default/pre-provisioned flow entry in flow table 217a to point to the new server and mirror/replicate the data traffic to controller 231 (e.g., revise the action to indicate transmission to both controller 231 and the associated server, as indicated by the action "S&C"). Controller 231 also updates version field of the default/pre-provisioned flow entry to include information about controller 231 and the new server (e.g., identifications of controller 231 and the new server 251 as designated by "S&C"). See operations 1353 and 1375 of FIG. 13B.

5. Once switch 211 indicates that the default/pre-provisioned flow entry has been modified to point to new server, transient mode operations may end and operation of load balancing system 200 may return to stable mode operations.

As discussed above with respect to FIG. 2, switch 211 may maintain a flow table 217a in switch memory 217, and controller 231 may maintain a flow server mapping table 235a in controller memory 235. Flow table 217a and flow server mapping table 235a will be discussed in greater detail below with respect to FIGS. 3A and 3B.

Flow table 217a is maintained by switch 211 in memory 217 as discussed above with respect to FIG. 2. As shown in FIG. 3A, the flow table 217a includes a plurality of flow entries labeled FE-1 to FE-m. For each flow entry FE, flow table 217a may include a match pattern MP, an action A, a version V, and a priority P.

The match pattern MP for a flow entry FE provides values for various protocol header elements such as an IP (Internet Protocol) source address, IP destination address, TCP (Transmission Control Protocol) source port number, TCP destination port number, etc. The match pattern can also include one or more unrestricted characters (also referred to as wildcard characters) that match any value. The match pattern is used to identify packets with header information (e.g., IP source/destination address(es), TCP source/destination port number(s), etc.) matching the match pattern. Where wildcard characters are used in the match pattern, only a portion of the packet header information may be considered for a match. As discussed in greater detail below, a flow entry of flow table 217a may be a default/pre-configured flow entry including at least one wildcard character in its match pattern (so that a default/pre-configured flow entry may match data packets of more than one data flow), or a dedicated flow entry including a match pattern without any wildcard characters in its match pattern (so that a dedicated flow entry may match data packets of only one data flow).

The action A for a flow entry may indicate one of: (1) sending matching data packets to an identified server 251 and to controller 231 (indicated by "Server and Controller" or "S&C"); (2) sending matching data packets to an identified server only (indicated by "Server" or "S"); or (3) sending matching data packets to controller 231 only (indicated by "Controller" or "C").

The version V for a flow entry may be set by controller 231. For all data packets that are sent to controller 231 (as indicated by the action A), the version V of the matched flow entry (or related information) is also sent along with the data packet. According to some embodiments, the version V field of a flow entry FE includes information (either embedded or via indirection) about the identity of server 251 and/or controller 231 to which data packet is to be sent. Stated in other words, the version V may indicate whether a data packet matching the flow entry is sent to: (1) both an associate server and controller 231 (indicated by "Server and Controller" or "S&C"); (2) only controller 231 (indicated by "Controller" or "C"); or (3) only an associated server (indicated by "Server" or "S"). If the version information indicates that data is being sent to a server, further information may identify the server (e.g., by providing the server ID). When a data packet reaches controller 231, version information (e.g., derived from one or more of the version field, the action field, the server ID field, etc.) provides that a decision made by switch 211 (about server selection) for a data packet is known to controller 231. This allows switch 211 and controller 231 to work together without latency requirements between controller 231 and switch 211.

The priority P for a flow entry may indicate a priority level for the flow entry in the event that header information for a data packet matches a match pattern MP for more than one flow entry FE (e.g., a data packet matches a match pattern for a relatively low priority default/preconfigured flow entry and for a relatively high priority dedicated flow entry). According to some embodiments, only two levels of priority may be used. For example, default/pre-provisioned flow entries (which may be generic to a plurality of data flows) may have a low priority P, and later added dedicated flow entries (which may be specific to only one data flow) may have a relatively high priority. Accordingly, a data packet may be processed using a low priority default/pre-provisioned flow entry only if a higher priority dedicated flow entry has not been added for the data flow including the data packet.

While the priority is illustrated as a field of each flow entry, the priority may be designated by other means. For example, flow table 217a may include high and low priority sub-tables, wherein packet header information for each data packet is compared with match patterns of dedicated flow entries in the high priority sub-table before comparing with match patterns of default/preconfigured flow entries in the low priority sub-table. If a match for a data packet is found from the high priority sub-table, the matching high priority dedicated flow entry is used to process the data packet, and comparison with match patterns of the low priority default/preconfigured flow entries can be omitted.

Switch processor 213 receives traffic of incoming data packets from client devices over a network through network interface 215, and switch processor 213 matches header information of the incoming data packets against match patterns MP of the flow entries FE in flow table 217a stored in memory 217a. If match patterns MP of more than one flow entry (e.g., a high priority dedicated flow entry and a low priority default/preconfigured flow entry) match the header information of a data packet, the data packet is processed according to the matching dedicated flow entry (that is specific to the data flow to which the data packet belongs) having the higher priority. Once a flow entry is identified for a particular data packet (based on match pattern and/or priority), the data packet is processed according to the action A for that flow entry FE. Depending on the action for the flow entry, the data packet may be: (1) sent by switch processor 213 through server interface 219 to an identified server and through controller interface 221 to controller 231 (e.g., if the flow entry is a default/preconfigured flow entry in stable mode operation); (2) sent by switch processor 213 through server interface 219 to an identified server only (e.g., if the flow entry is a dedicated flow entry); or (3) sent by switch processor 213 through controller interface 221 to controller 231 only (if the flow entry is a default/pre-configure flow entry in transient mode operation).

Controller processor 233 installs flow entries in switch 211 by transmitting instructions (e.g., flow entry install instructions) to install the flow entries through switch interface 237 to switch 211. These instructions are received by switch processor 213 through controller interface 221, and responsive to these instructions from controller 231, switch processor 213 installs the flow entries in flow table 217a of memory 217. Because switch 211 and controller 231 are separate (e.g., physically remote), a time lag may be expected between the time that controller 231 issues a flow entry install instruction to switch 211 and the time that the flow entry is actually installed at switch 211 (i.e., saved in flow table 217a of memory 217). Similarly, time lag may be expected between the time that switch 211 sends a data packet to controller 231 and the time that the data packet reaches the controller 231.

Flow server mapping table 235a is maintained in memory 235 at controller 231, and a structure of flow server mapping table 235a is illustrated in FIG. 3B. Flow server mapping table 235a provides a mapping between various data flows (identified by respective data flow IDs) encountered by switch 211 and the associated servers (identified by respective server IDs) to which data packets of the data flows were forwarded. Flow server mapping table 235a also maintains information about the flow entry (e.g., identified by the match pattern for the flow entry) to which a data flow/packet matched and the version V of the flow entry. Because switch 211 and controller 231 are separate (e.g., remote from each other), there may be a time lag between initiation of a new data flow that has been encountered by switch 211 and representation of the new data flow in flow server mapping table 235a at controller 231. Because each flow entry should have a unique matching pattern, each flow entry may be identified using its matching pattern.

Accordingly, flow table 217a of switch 211 may provide flow entries (including default/pre-configured flow entries and dedicated flow entries) defining data flow processing supported by switch 211, and each flow entry may be added to flow table 217a responsive to a flow installation instruction received from controller 231. As discussed above, default/preconfigured flow entries may be installed during initialization mode operations and modified during transient mode operations, and dedicated flow entries may be installed during stable mode operations and transient mode operations. Moreover, flow server mapping table of controller 231 may provide an entry for each data flow processed by switch 211.

As briefly discussed above, operations of load balancing system 200 can be broken down into three modes: (1) an initialization mode operations; (2) stable mode operations; and (3) transient mode operations.

Initialization mode operations may be performed when load balancing system 200 starts operation. At system initialization, there are no flow table entries in flow table 217a of switch 211, and there are no entries in flow to server mapping table 235a of controller 231. In this situation, controller 231 may install a limited number of default/pre-provisioned flow entries (also referred to as default flow entries) in flow table 217a of switch 211. These default/pre-provisioned flow entries may have following characteristics: (a) for any data flow, one and only one of the default/pre-provisioned flow entries will match; (b) each default/pre-provisioned flow entry is associated with (i.e., maps to) only one server; (c) the initial action A associated with each default/pre-provisioned flow entry is to send the matching data packet to the associated server (identified by the server identification SID for the flow entry) and to controller 231; (d) the version V associated with each default/pre-provisioned flow entry initially indicates transmission to the associated server (identified by the server identification SID for the flow entry) and to controller 231 (consistent with the action A); and (e) a low priority is assigned to each default/pre-provisioned flow entry.

During initialization mode operations, flow table 217a is thus populated with a limited number of default/pre-provisioned (i.e., default) flow entries. For uniform data traffic distribution, a proportion of data flows that are directed to a server is dependent on a number of default/pre-provisioned flow entries that point to the server (as indicated by the server identification for each flow entry).

The default/pre-provisioned flow entries provide that any/most data packet(s) coming to switch 21 is/are directed to one of the servers 251. Depending on capabilities of switch 211, the default/pre-provisioned flow entries can be constructed using Ethernet source header, IP (Internet Protocol) source address, IP destination address, TCP source port number, TCP destination port number, etc.

By way of example, a load balancing system may include four servers (Server-1, Server-2, Server-3, and Server-4) with server identifications SID-1 (for Server-1 251-1), SID-2 (for server-2 251-2), SID-3 (for server-3 251-3), and SID-4 (for server-4 251-4), and the default/pre-provisioned (or default) flow entries may use match patterns based on IP source addresses. In this example, the flow table 217a may include default/pre-provisioned flow entries FE-1 to FE-255 as shown in FIG. 4 where IP addresses are provided as match patterns in dotted decimal format and the 'X' symbol represents a wildcard or 'do not care' for the match pattern. For each of the default/pre-provisioned (or default) flow entries, the priority is low, and the action and version ("S&C") both indicate transmission to the associated server (indicated by the server ID for the flow entry) and controller 231.

In the example of FIG. 4 with the illustrated default flow entries, data packets received from client devices at switch 211 having IP source address 10.10.10.1 will be directed (at least initially) to Server-1 251-1 (having server ID SID-1), data packets received at switch 211 having IP source address 10.10.10.2 will be directed (at least initially) to Server-2 251-2 (having server ID SID-2), etc.

During stable mode operations, data packets that match default/pre-provisioned (or default) flow entries (e.g., based on the flow entry match patterns and the IP source addresses of the data packets) are sent to the server indicated by the server ID for the matching flow entry. According to some embodiments, the same data packets are sent to both controller 231 and to the indicated server per the default/pre-provisioned flow entry action (S&C) indicating transmission to both the server and controller 231. By sending a data packet to both controller 231 and the indicated server when the match is with a default/pre-provisioned flow entry, controller 231 can generate/maintain flow server mapping table 235a listing all data flows encountered by switch 211 and mapping each data flow to the associated server as discussed above with respect to FIG. 3B.

By way of example, a data flow may be generated by a client using an IP source address 10.10.10.1 so that each data packet of the data flow includes the IP source address 10.10.10.1 in its header information. When the first data packet of this data flow is received at switch processor 213 through network interface 215, processor 213 searches flow entry matching patterns from flow table 217a of memory 217 for a match(es) with the IP source address. In this example, the IP source address 10.10.10.1 matches the matching pattern X.X.X.1 of flow entry FE-1 as shown in FIG. 4, and the action A for flow entry FE-1 (Server&Controller or "S&C") indicates that the data packet should be sent to server-1 (indicated by server ID SID-1 for flow entry FE-1) and to controller 231. Accordingly, processor 213 forwards the data packet through server interface 219 to server-1 and through controller interface 221 to controller 237. In addition, processor 213 forwards the version (Server&Controller or "S&C") or related information for flow entry FE-1 to controller 231 indicating transmission of the data packet to both controller and server-1.

Upon receipt of this first data packet for the data flow through switch interface 237 at controller processor 233, processor 233 checks flow server mapping table 235a to determine if an entry for this data flow has been previously created. Because this is the first data packet for the data flow, no entry will have been created, and processor 233 may create an entry in the flow server mapping table 235a for the new data flow. This entry (into the table of FIG. 3B) may include a data flow identification DFID of the data flow including the IP source address 10.10.10.1, an identification of the flow entry (such as the flow entry match pattern X.X.X.1), the version/action information S&C, and the identification SID-1 of the server to which the data packet was transmitted. When a next data packet for the same data flow is received at switch 211 and forwarded to controller 231, processor 233 will not need to generate another entry in the flow server mapping table 235a for this data flow.

Replication of data packets to controller 231 thus allows controller 231 to track data flows encountered by switch 211 using flow server mapping table 235a without adding significant latency to transmission of data packets to the servers.

Controller 231 may update the flow server mapping table 235*a* based on data packets and associated information (e.g., version/action information and server ID).

By way of example, controller 231 may install the default flow entries of FIG. 4 in flow table 317*a* during initialization mode operations. Before a first data packet is received from a client at network interface 215, flow server mapping table 235*a* of controller 231 may be empty, and there may be no dedicated flow entries in flow table 217*a*.

When a first data packet is received at network interface 215 for a first data flow having a flow ID of 10.10.10.1, there are no dedicated flow entries in flow table 217*a* matching 10.10.10.1, and the only match for the data packet is with flow entry FE-1 having match pattern X.X.X.1. Based on the Action S&C for flow entry FE-1, processor 213 transmits the data packet through controller interface 221 to controller 233 and through server interface 219 to server 251-1 corresponding to server ID SID-1.

When the first data packet for the first data flow is transmitted to controller 231, switch processor 213 also transmits information indicating that the data packet was transmitted to server 251-1 and to controller (e.g., transmitting the version S&C and the server ID SID-1). Controller processor 233 may thus receive (through switch interface 237) the data packet (of just a data flow identification of the data packet), the action/version information, and the server ID information for the first data packet of the first data flow, and controller processor 233 may create an entry in flow server mapping table 235*a* for the new data flow as indicated by data flow 10.10.10.1 of FIG. 5 (including the data flow ID, the default flow entry match pattern, the server ID, and the version information). Once the entry for the data flow 10.10.10.1 has been created responsive to the first data packet of this data flow, additional data packets for this data flow may be received by controller 231 without generating additional entries for the data flow in flow server mapping table.

When a first data packet is received at network interface 215 for a second data flow having a flow ID of 10.10.10.2, there are no dedicated flow entries in flow table 217*a* matching 10.10.10.2, and the only match for the data packet is with flow entry FE-2 having match pattern X.X.X.2. Based on the Action S&C for flow entry FE-2, processor 213 transmits the data packet through controller interface 221 to controller 233 and through server interface 219 to server 251-2 corresponding to server ID SID-2.

When the first data packet for the second data flow is transmitted to controller 231, switch processor 213 also transmits information indicating that the data packet was transmitted to server 251-1 and to controller (e.g., transmitting the version S&C and the server ID SID-2). Controller processor 233 may thus receive (through switch interface 237) the data packet for the second data flow, the action information, and the server ID information for the first data packet of the second data flow, and controller processor 233 may create an entry in flow server mapping table 235*a* for the second data flow as indicated by data flow 10.10.10.2 of FIG. 5 (including the data flow ID, the default flow entry match pattern, the server ID, and the version information). Once the entry for the data flow 10.10.10.2 has been created responsive to the first data packet of this data flow, additional data packets for this data flow may be received by controller 231 without generating additional entries for the data flow in flow server mapping table.

Replication of packets to controller 231, however, may result in a large amount of data packets being sent to controller 231. For connectionless protocols (such as UDP or User Datagram Protocol), only a few of these data packets (i.e., data packets that indicate new data flows) may be useful to controller 231. Subsequent data packets for data flows that are already known to controller 231 (i.e., data flows already listed in flow server mapping table 235*a*) may not add significant value.

According to some embodiments, controller 231 may instruct switch 211 to install dedicated flow entries for some existing data flows. The dedicated flow entries may be created to reduce transmission of data packets to controller 231, and these dedicated flow entries may have higher priority than the default/pre-provisioned (or default) flow entries.

The action A associated with these dedicated flow entries is "S" (or server) indicating that matching data packets are to be sent only to the server associated with the dedicated flow entry (e.g., as indicated by the server ID for the dedicated flow entry). Unlike default/pre-provisioned flow entries, according to some embodiments, the dedicated flow entries do not send matching data packets (or information relating thereto) to controller 231.

A dedicated flow entry may be installed for an existing data flow already identified in the flow server mapping table 235*a* of controller 231. A granularity at which controller 231 maintains flow information for data flows processed using dedicated flow entries need not be the same as a granularity of flow information maintained for data flows processed using default/pre-provisioned flow entries at switch 211. For example, default/pre-provisioned flow entries can be based on source IP addresses. The flow server mapping table 235*a* at controller 231, however, can be maintained using data flow definition/identification based on a standard 5 tuple for TCP/IP packets (source IP address, destination IP-address, protocol, TCP source port, and TCP destination port).

A dedicated flow entry may thus be provided for an existing data flows (initially processed using a default/pre-configured flow entry), and data packets matching a dedicated flow entry are sent to the same associated server as before for the respective data flows. Since new dedicated flow entry maintains the data flow to server mapping, it does not disrupt existing data flows.

By way of example referring to the default flow entries of FIG. 4 in flow table 317*a* and the flow server mapping table entries of FIG. 5 discussed above, subsequent data packets for data flow 10.10.10.1 may be received (through network interface 215) at processor 213 and processed according to default flow entry FE-1 so that these subsequent data packets are transmitted to both controller 231 and server 251-1. Upon receipt of these subsequent data packets at controller 231, processor 233 will not create additional entries for data flow 10.10.10.1 in flow server mapping table 235*a* because an entry already exists for data flow ID 10.10.10.1. Processor 233 may, however, track a volume of traffic generated by data flow 10.10.10.1 and by any other data flows processed using default flow entries.

If processor 233 determines that a volume of traffic generated by data flow 10.10.10.1 exceeds a threshold (e.g., data flow 10.10.10.1 is an elephant/large flow), controller processor 233 may install a high priority dedicated flow entry DFE-1 for data flow 10.10.10.1 in flow table 217*a* with a match pattern of 10.10.10.1 as shown in FIG. 6. According to some embodiments, different sub-tables may be used to distinguish high priority dedicated flow entries and low priority default flow entries, and/or high/low priority fields may be used to distinguish the different flow entry types. According to some embodiments of FIG. 6, a match pattern for a default flow entry may be provided as an IP source address with at least one wildcard character, and a match pattern for a dedicated flow entry may be provided as an IP source address without any wildcard characters.

The default flow entry for data flow 10.10.10.1 includes the same server ID as the default flow entry (FE-1) previously used to process data packets of data flow 10.10.10.1, so that data packets are transmitted to the same server (521-1) before and after creation of the dedicated flow entry. When data packets of data flow 10.10.10.1 are processed using the dedicated flow entry, however, the data packets and/or information relating thereto are not transmitted to controller 321 because the action "S" indicates only transmission to the server. Accordingly, traffic between switch 211 and controller 321 may be reduced.

Once dedicated flow entry DFE-1 is created for data flow 10.10.10.1, data packets will match with match patterns for both default flow entry FE-1 (X.X.X.1) and dedicated flow entry DFE-1 (10.10.10.1). Because the dedicated flow entry is given higher priority, however, data packets of this data flow will be processed according to the dedicated flow entry DFE-1. Other data flows matching with match pattern X.X.X.1 but not matching 10.10.10.1 (e.g., 10.10.20.1, 10.20.10.1, etc.) may continue to be processed using default flow entry FE-1.

For transient mode operations, controller 231 may modify the server associated with a default flow entry without affecting previously existing data flows processed using the modified default flow entry to allow dynamic re-distribute of load among servers. A default flow entry may not be modified directly, however, because direct modification may disrupt some existing data flows (i.e., continuing data flows initiated and processed using the default flow entry before modification of the default flow entry). Stated in other words, changing a server ID of a default flow entry without taking other precautions may cause new data packets of a previously existing data flow to be rerouted to the new server thereby disrupting the data flow.

For example, default flow entry FE-1 may be initially installed to send data packets of matching data flows to server 521-1 having identification SID-1 as shown in FIGS. 4 and 6. Controller processor 233 may later decide that this default flow entry should be changed to send data flows to server 521-2 having identification SID-2. If default flow entry FE-1 is modified directly to transmit data packets to server 521-2 (by changing the associated server identification from SID-2 to SID-2) without taking other measures, data packets for an existing data flow being processed using default flow entry FE-1 will be sent to server 521-1 (having SID-1) and then to server 521-2 (having SID-2) causing disruption to the data flow.

To reduce such disruption (e.g., to provide reduced hit and/or hitless modification), controller processor 233 may modify the default flow entry to send traffic only to controller 231 during transient mode operations by changing action and/or version fields for default flow entry FE-1 from S&C (transmit to server and controller 231) to C (transmit to controller 231 only) as shown in FIG. 7A. Accordingly, during transient mode operations for default flow entry FE-1, data packets having header information matching with match pattern X.X.X.1 (but not 10.10.10.1 of dedicated flow entry DFE-1) are received (through network interface 215) at switch processor 213, and the data packets or data flow IDs thereof are transmitted through controller interface 221 to controller 231 (but not to any of the servers).

Controller processor 233 may thus receive these data packets or data flow IDs thereof (through switch interface 237) during the transient mode operation with information (e.g., version "C") indicating that the packets (or information relating thereto) were only transmitted to the controller without transmitting the data packets to a server. If such a data packet matches an entry of flow server mapping table 235a, the data packet belongs to a data flow that was initiated before modifying flow entry FE-1, and controller processor 233 initiates sending the data packet to the previous server associated with the default flow entry (e.g., server 521-1 having ID SID-1). If such a data packet does not match an entry of flow server mapping table 235a, the data packet belongs to a new data flow initiated after modifying flow entry FE-1, and controller processor 233 sends the data packet to the new server associated with the default flow entry (e.g., server 521-2 having ID SID-2). During the transient mode operation, controller processor 233 also searches flow server mapping table 235a for all data flows processed using the flow entry FE-1 before modification and installs dedicated flow entries (as needed) for all of these data flows. If a dedicated flow entry has already been created for a data flow previously processed using the transient default flow entry (e.g., DFE-1 for data flow 10.10.10.1) controller processor 233 does not need to install/reinstall a dedicated flow entry for this data flow.

During transient mode operation, controller processor 233 installs dedicated flow entries in switch flow table 217a that correspond to all previously existing flows that match the previous version of the default flow entry being modified. These existing data flows may be identified using flow server mapping table 235a generated during stable mode operation to provide that existing data flows are not affected due to modification of the default flow entry. It may not be necessary that for every flow, an independent dedicated flow entry is installed. If multiple flows can be combined, then a dedicated flow entry that corresponds to the multiple data flows can be installed.

As shown in FIG. 7B, flow server mapping table 235a may include two data flows that were initially processed using flow entry FE-1 before modification of FE-1. As discussed above, a dedicated flow entry may have previously been generated for data flow 10.10.10.1 because of a high level of traffic as indicated by the match pattern and version "S" for this data flow in flow server mapping table 235a of FIG. 7B. Another data flow 10.10.20.1 matching X.X.X.1, may have been initiated prior to modification of FE-1, and this data flow may be identified during transient mode operation as requiring a dedicated flow entry. Accordingly, a second dedicated flow entry DFE-2 may be installed in flow table 217a as shown in FIGS. 7C and 7E. As shown in FIG. 7D, flow server mapping table may be modified to reflect the new match pattern and version information for data flow 10.10.20.1 corresponding to the new dedicated flow entry from data flow 10.10.20.1 that have been installed at switch 211.

With flow entry FE-1 still in transient mode operation and the new dedicated flow entry(ies) installed based on flows initially identified in flow server mapping table, the transient flow entry FE-1 may still identify the old server with identification SID-1 while action/version information "C" indicates transmission of data packets to controller 231 only.

According to some embodiments, for some grace time (e.g., T seconds) after installing the dedicated flow entry(ies) and before updating the default flow entry (e.g., FE-1), load balancing system 200 may remain in transient mode operation with all data packets matching default flow entry FE-1 being transmitted from switch 211 only to controller 231 and controller 231 transmitting such data packets to the appropriate server. The grace period may provide that a dedicated flow entry is installed in switch 211 for all data flows for which a server selection decision was made at switch (i.e., for all data packets forwarded to controller 231 and to server SID-1 based on the initial action/version S&C at FE-1).

Due to potentially significant latency in communications between controller 231 and switch 211, there may be some in-flight data packets from switch 211 to controller 231 that represent new flows, and data packets for these flows may have been sent to server 521-1 based on the previous version of the transient default flow entry. The grace period may allow controller 211 to install dedicated flow entries for such flows.

Time T may be the time lag between the decision taken by switch 211 to send a data packet to a server (based on the default flow entry with original version/action S&C) and the subsequent dedicated flow entry installation in flow table 217a (based on instruction from controller 231). During the grace time, controller 231 may receive packets associated with the transient default flow entry with version/action information of "Controller" (or "C") and others with version/action information "S1 and Controller" or (or S&C). The action for the data packets received at controller 231 during this grace period is dependent on the version information and if the data flow exists in the flow sever mapping table. Controller 231 determines the action for these data packets during the grace period based on the table of FIG. 8.

If a data packet is received at controller 231 for the transient default flow entry with version/action information "S&C" and the identification of the old server (e.g., server identification SID-1 for server 521-1), the data packet has already been transmitted by switch 211 to server 512-1, and controller 321 does not transmit the data packet to any server. If the data flow is already included in flow server matching table 235a, no further action by the controller is required because the data packet has already been transmitted to server 521-1 and the dedicated flow entry has already been installed. If the data flow is not included in the flow server matching table 235a, controller 231 installs the data flow in the flow server mapping table 235a and installs a dedicated flow entry in flow table 217a directed to the old server.

If a data packet is received at controller 231 for the transient default flow entry with version/action information "C", the data packet has not been transmitted to a server, and controller 231 should transmit the data packet to the appropriate server. If the data flow for the data packet exists in the flow server mapping table, controller 231 transmits the data packet to the server indicated by the server ID for the data flow entry in the flow server mapping table 235a. If the data flow for the data packet does not exist in flow server mapping table 235a, controller 231 installs a data flow entry in flow server mapping table 235a, installs a dedicated flow entry in flow table 217a with the identification of the new server (e.g., identification SID-2 for server 512-2), and transmits the data packet to the new server.

The grace period operations of FIG. 8 may thus be performed until expiration of the time T, and then controller 231 may modify the default flow entry FE-1 to point to the new server 512-2 (by changing the server ID for FE-1 to SID-2) and to provide the steady mode version/action indication S&C as shown in FIG. 9.

Data packets received at controller 231 (after expiration of the grace period) can then have version/action information as "Controller", and as "Controller and new server S2". Action taken by controller 231 will be dependent on version/action information and on if the flow already exists in flow server mapping table 235a. At this time (after expiration of the grace period), actions performed by controller for data packets received at controller 231 may be determined according to the table of FIG. 10.

If a data packet is received at controller 231 for the transient default flow entry with version/action information "S&C" and the identification of the new server (e.g., server identification SID-2 for server 521-2), the data packet has already been transmitted by switch 211 to server 512-2, and controller 321 does not transmit the data packet to any server. If the data flow is already included in flow server matching table 235a, no further action by the controller is required because the data packet has already been transmitted to server 521-2. If the data flow is not included in the flow server matching table 235a, controller 231 installs the data flow in the flow server mapping table 235a.

If a data packet is received at controller 231 for the transient default flow entry with version/action information "C", the data packet has not been transmitted to a server, and controller 231 should transmit the data packet to the appropriate server. If the data flow for the data packet exists in the flow server mapping table, controller 231 transmits the data packet to the server indicated by the server ID for the data flow entry in the flow server mapping table 235a. If the data flow for the data packet does not exist in flow server mapping table 235a, controller 231 installs a data flow entry in flow server mapping table 235a with the associated server identification for the new server (e.g., SID-2), and transmits the data packet to the new server (e.g., 521-2).

Once switch 211 indicates that the default flow entry has been modified to point to the new server (e.g., server ID field has been updated to the new server ID SID-2), transient mode operations for default flow entry may end and load balancing system 200 may return to stable mode operations.

According to some embodiments disclosed herein, all flow entries in switch flow table 217a may be installed by controller 211 to provide centralized and/or deterministic policy control. When load balancing system 200 is not undergoing load re-distribution, processing of data packets may be localized at switch 211 so that network latency between controller 231 and switch 211 does not significantly affect packet processing. Moreover, some embodiments may provide reduced hit and/or hitless load re-distribution of traffic among servers in a load balancing system. For load re-distribution, system convergence time (i.e., a time taken for controller 231 to get involved in switching decisions and back to localizing these decision to switch 211) may be deterministic and independent of data flow durations. Load balancing systems according to some embodiments may be implemented using commodity switches that are compliant with Openflow 1.3 protocols. During load re-distribution, reduced/minimal flow entries may be installed in switch 211.

The flowchart of FIG. 11 illustrates data packet processing at controller 231 for stable and transient mode operations. When a default flow entry is being modified, the existing server may be referred to as S1 and the new server may be referred to as S2. In stable mode operations for a default flow entry, the default flow entry is not being modified. If the default flow entry matching a data packet is in stable mode operation at block 1101 (i.e., the default flow entry is not being modified), switch 211 forwards the data packet to the server indicated by the server ID field of the default flow entry, and switch 211 forwards the data packet to controller 231 with the version/action information S&C and the server ID indicating that the data flow has been transmitted to the server at block 1103. Controller 231 uses the data packet and associated information to update flow server mapping table 235a (if needed).

If the default flow entry matching a data packet is in transient mode operation at block 1101 and the grace period time 'T' has not elapsed at block 1105, switch 211 and/or controller 231 process the data packet using actions discussed above with respect to the table of FIG. 8 at block 1107. As discussed above, the time 'T' is a time lag between the decision taken by switch processor 213 using flow table 217a to send the data packet to a server (based on the default flow entry) and the subsequent flow entry installation in flow table 217a (based on command from controller 231. If the default flow entry matching a data packet is in transient mode operation at block 1101 and the grace period time 'T' has elapsed at block 1105, switch 211 and/or controller 231 process the data packet using actions discussed above with respect to the table of FIG. 10 at block 1109.

According to some embodiment, switch 211 may maintain a table of data flows that it has encountered/processes. Switch 211 may then replicate only the following packets to controller 231:

1. Packets that indicate new flows (detected by miss in cache table at switch 211);
2. Packet that indicate end of flows (for protocols that send such information in packets such as TCP); and/or
3. Packets that indicate that a connection is alive, for example, by transmitting one packet per liveliness interval (e.g., one packet per minute) for existing connections.

By providing the cache of data flows at switch 211 as discussed above, a number of data packets transmitted from switch 211 to controller 231 may be further reduced.

Flow definition (i.e., whether the flow is identified as standard 5-tuple of an IP packet, as a 3-tuple, etc.) may be configured by controller 231. This may be required so that flow definitions are the same at switch 211 and controller 231.

In addition, the liveliness interval may also be configured by controller 211. Use of a liveliness interval may reduce a number of packets replicated/transmitted to controller 231. Use of a liveliness interval and/or configuration thereof by controller 211 may be optional, but use of a liveliness interval may reduce a number of packets sent to controller 231 for each active data flow.

To generate flow server mapping table 235a at controller 231, complete/full packet data may not need to be sent to controller 231. Instead, only part of the data packet from which flow information can be derived may need to be sent to controller 231.

Similarly, when sending a data packet out from controller 231 via switch 211, it is not required to send the full data packet to controller 231 and then back to switch 211 before transmission to a server during transient mode operation for a default flow entry. Instead, switch 211 can buffer the data packet and send only a pointer/identifier to controller 231. Controller 231 can then use the pointer/identifier to indicate to switch 211 the data packet to be sent and the server to which it should be sent. Accordingly, switch 211 can be configured to send only part of the data packet (instead of the complete data packet) to controller 231 (to generate flow table and/or flow server mapping table information) and an identifier (that can be later used by controller to identify the packet to be sent out). Such operations may be supported by version 1.0 of the Openflow protocol.

Barrier messages can be used by controller 231 to receive indication of entry modification in switch 211. With indication of entry modification, controller 231 issues a barrier command after issuing the command to modify the default flow entry. Switch 211 installs the modification of default flow entry transmits a barrier command response to indicate that the installation is complete. The barrier command response indicates that all previous commands from controller 231 have been executed. Barrier messages may be supported by the Openflow 1.0 protocol.

The Openflow protocol may allow controller 231 to pass opaque data when installing flow entries in flow table 217a. If the data packet is send to controller 231 by switch 211, the opaque data may also be passed along with the data packet. Use of such opaque data may be available in the Openflow 1.3 protocol using a cookie field.

According to some embodiments discussed above, load balancing and controller 231 operations are performed by a same entity. According to some other embodiments, load balancing and controller 231 operations may be performed by separate entities with minor modification. In such an embodiment, controller 231 is used to modify the entries in switch 211. All other logic processing may occur in a load balancing application. The data packets are also replicated to the load balancing application (instead of controller 231).

Some embodiments may provide details of modifying one default flow entry for ease of understanding. Multiple default entries, however, may be modified in parallel using the same operations.

According to some embodiment, data packets for dedicated flow entries (as opposed to default flow entries) are sent only to the indicated server. As a result, for connection oriented protocols (such as TCP), packets that indicate end of flow may not be sent to controller 231. Controller 211 may thus be unaware that data flows have terminated. According to some embodiments, this issue may be resolved by:

1. Using timeouts. According to the Openflow protocol, controller 211 can enable notifications to be sent from switch 211 to controller 231 for data flows that have not received packet for certain "timeout" duration. This may be accomplished by setting an inactivity timeout with the flow entry.
2. Replicating packets to controller 211. In this approach, data packets for specific flow entries are also replicated to controller 231 so that controller 231 can detected the end of flow from data packets.

Figure 12:
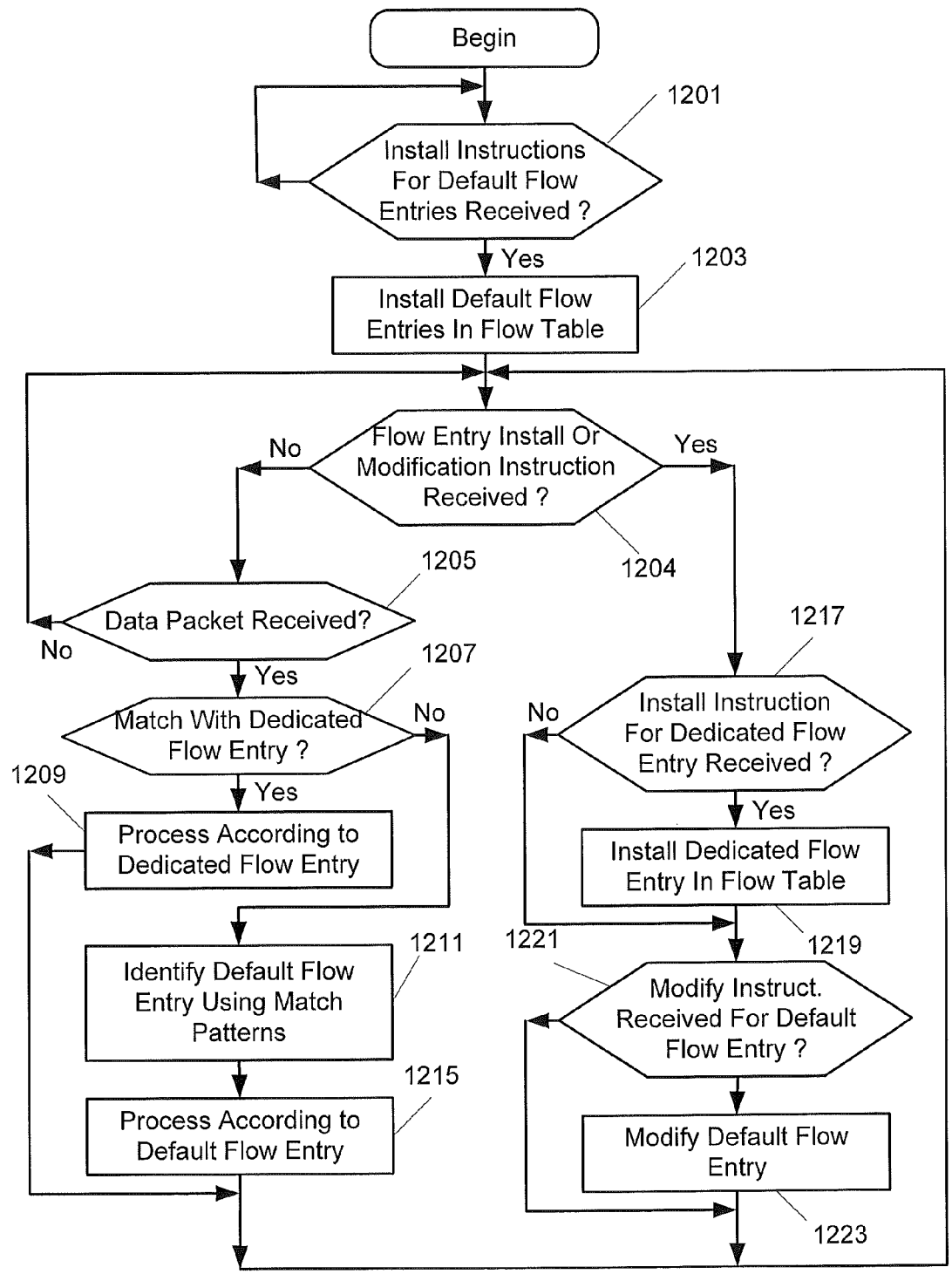
FIG. 12 is a flow chart illustrating switch operations according to some embodiments.

Operations of switch 211 will now be discussed with respect to the flow chart of FIG. 12 according to some embodiments. Initialization mode operations may be performed, for example, according to operations of blocks 1201 and 1203. Responsive to instructions received from controller 231 through controller interface 221 at block 1201, switch processor 213 may provide a flow table (217a) including a plurality of default flow entries. Each of the plurality of default flow entries may include a respective match pattern with each of the match patterns of the plurality of default flow entries being different and with each of the match patterns of the plurality of default flow entries including at least one unrestricted character (also referred to as a wildcard) so that each of the match patterns is satisfied by a respective plurality of data flow identifications. Moreover, each of the plurality of default flow entries may include an action to be performed for data packets having data flow identifications that satisfy the respective match pattern. Examples of flow serving mapping tables are discussed above with respect to FIGS. 3A and 4.

With the default flow entries installed in flow table 217a, initialization mode operations may be complete at switch 211. As long as there are no instructions to install a dedicated flow entry or modify a default flow entry at block 1204, switch processor 213 may proceed with stable mode operations at blocks 12-5 to 1215. Upon receipt of a data packet (including a data flow identification such as an IP source address) from a client device at block 1205 through network interface 215, processor 213 may first determine at block 1207 if the data flow ID matches any high priority dedicated flow entries. If the data flow identification does not match any dedicated flow entries at block 1207, then processor 213 identifies a default flow entry from the flow table having a match pattern that is satisfied by the data flow ID at block 1211. Because all of the default flow entries have different match patterns, each data flow ID should satisfy only one match pattern and should thus match with only one default flow entry.

Upon identifying the default flow entry for the data flow ID at block 1211, the data packet is processed according to the default flow entry at block 1215. If the action indicated transmission to server and controller (S&C), the data packet may be transmitted to the server indicated by the Server ID, and the data packet (or just the data flow ID of the data packet) may be transmitted to controller 231 together with the Server ID, an identification of the default flow entry (e.g., the match pattern), and an indication of the action (that the data packet has been or is being transmitted to the server). If the action indicated transmission to controller only (C), the data packet (or just the data flow ID of the data packet) may be transmitted to controller 231 together with the Server ID, an identification of the default flow entry (e.g., the match pattern), and an indication of the action (that the data packet will not be transmitted to the server absent further instructions to do so).

If processor 213 determines at block 1207 that the data flow ID does match a high priority dedicated flow entry from flow table 217a (i.e., the high priority dedicated flow entry includes a match pattern that is satisfied by the flow ID), then the data packet is processed according to the high priority dedicated flow entry. As discussed above, a dedicated flow entry may have a match pattern that is specific to a single data flow ID and an action to transmit matching data packets to the indicated server without informing controller 231.

If a designated flow entry is to be installed or a default flow entry is to be modified (responsive to instructions from controller 231), processor 213 may proceed with operations of blocks 1217 to 1223. If an instruction is received from controller 231 through controller interface 221 to install a dedicated flow entry at block 1217, processor 213 may install the dedicated flow entry in flow table 217a at block 1219. As discussed above, dedicated flow entries may be installed during stable mode operations to reduce replication of traffic to controller 231, or during transient mode operations to maintain pre-existing flows to old controllers.

If an instruction is received from controller 231 through controller interface 221 to modify an existing default flow entry at block 1221, processor 213 may modify the indicated default flow entry as instructed. During transient mode operations, a default flow entry may first be modified (from S&C to C) to report matching data packets to controller 231 (either transmitting the completed data packet or just the data flow ID to controller 231) without transmitting the matching data packets to a server (unless further instructions are provided) while maintaining the original server ID. The default flow entry may later be modified to point to the new server and (from C to S&C) to report matching data packets to controller 231 and to forward matching data packets to the new server.

Figure 13A:
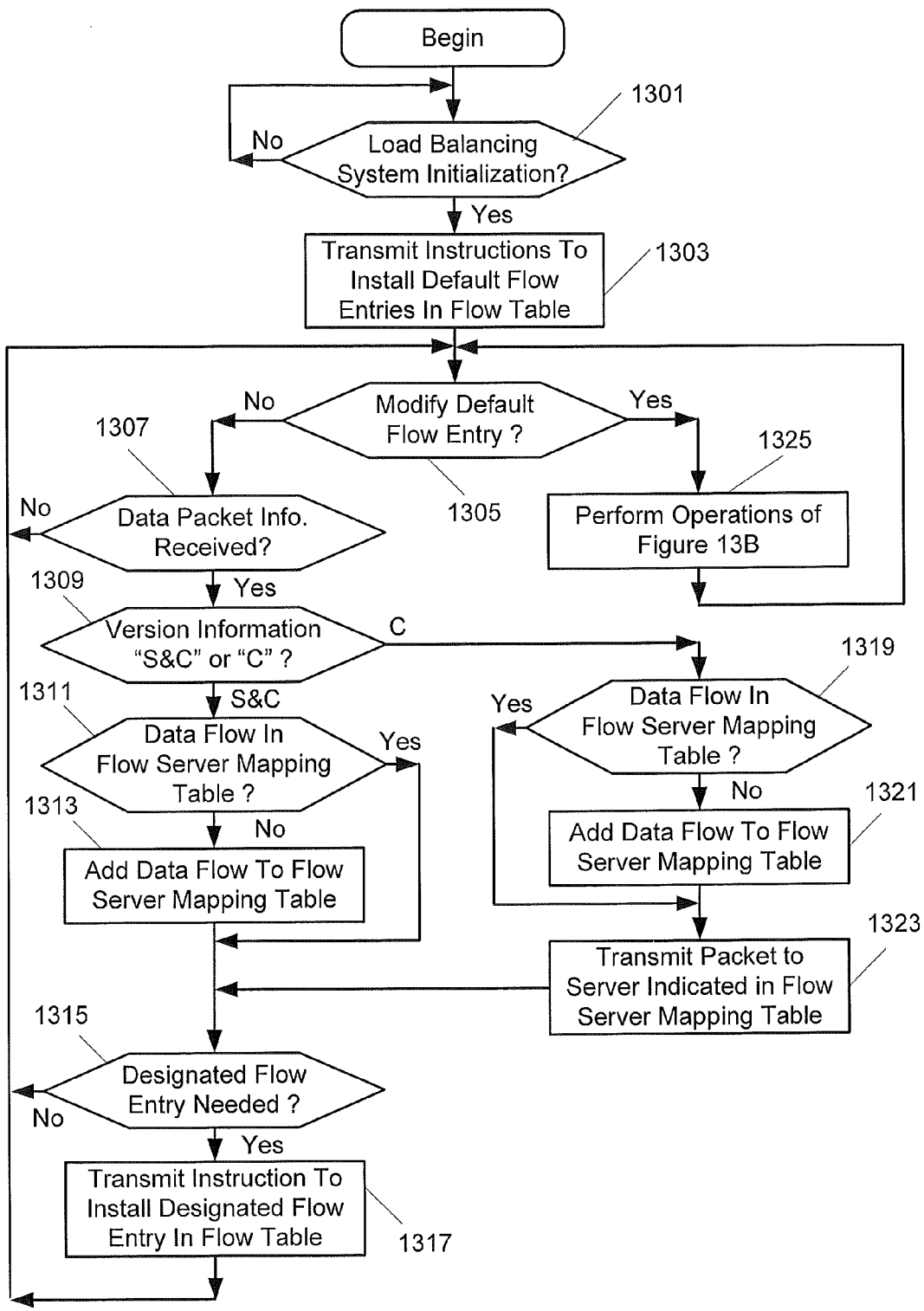
FIGS. 13A and 13B are flow charts illustrating controller operations according to some embodiments.

Operations of controller 231 will now be discussed with respect to the flow chart of FIGS. 13A and 13B according to some embodiments. Initialization mode operations may be performed, for example, according to operations of blocks 1301 and 1303. Controller processor 233 may initiate initialization operations at block 1301 when load balancing system 200 is installed. At block 1303, processor 233 may transmit the instructions to install the plurality of default flow entries in flow table 217a at switch 211. As discussed above, each of the plurality of default flow entries includes a respective match pattern with each of the match patterns of the plurality of default flow entries being different and with each of the match patterns of the plurality of default flow entries including at least one unrestricted character (also referred to as a wildcard) so that each of the match patterns is satisfied by a respective plurality of data flow identifications. Moreover, each of the plurality of default flow entries includes an action to be performed for data packets having data flow identifications that satisfy the respective match pattern.

As long as there are no modifications to default flow entries at block 1305, controller 231 may proceed with stable mode operations of blocks 1307 to 1323. If information regarding a data packet is received at block 1307, processor 233 may determine at block 1309 if the associated data packet has been transmitted to a respective server and at blocks 1311 or 1319 if the data flow is already included in the data flow mapping table. As discussed above with respect to switch 211, an action of a default flow entry dictates whether a data packet is forwarded to a server and reported to controller (S&C) or just reported to controller 231. The reporting to the controller may include the data flow ID (provided either by forwarding the complete data packet or by forwarding the data flow ID without the complete data packet), an indication whether the data packet has been forwarded to the server (referred to as version information), and the match pattern of the default flow entry (used as an identification of the default flow entry).

If the data packet has already been transmitted to the respective server at block 1309, processor 233 determines at block 1311 if the data flow has already been added to the flow server mapping table at block 1311. If not, the data flow is added to the flow server mapping table (discussed above with respect to FIGS. 3B and 5) at block 1313.

If the data packet has not been transmitted to the respective server at block 1309, processor 233 determines at block 1319 if the data flow has already been added to the flow server mapping table at block 1311. If not, the data flow is added to the flow server mapping table (discussed above with respect to FIGS. 3B and 5) at block 1321. If the data packet has not been transmitted to the respective server at block 1309, processor 233 may initiate transmission of the data packet to the server indicated for the data flow ID in the flow server mapping table at block 1323. If the data packet is received at controller 231 at block 1307, processor 233 may transmit the data packet to the indicated server (bypassing switch 211) at block 1323, or processor 233 may transmit the data packet through switch interface 237 and switch 211 to the indicated server. If the data packet is not transmitted to controller 231 at block 1307, processor 233 may transmit an instruction through switch interface 237 to switch 211 to forward the data packet to the indicated server.

At block 1315, processor 233 may determine that a new designated flow entry may be useful to reduce unnecessary traffic between switch 211 and controller 231. If such a determination is made (e.g., for an elephant flow) at block 1315, processor 233 may transmit an instruction through switch interface 237 for switch 211 to install a designated flow entry in flow table 217a.

Figure 13B:
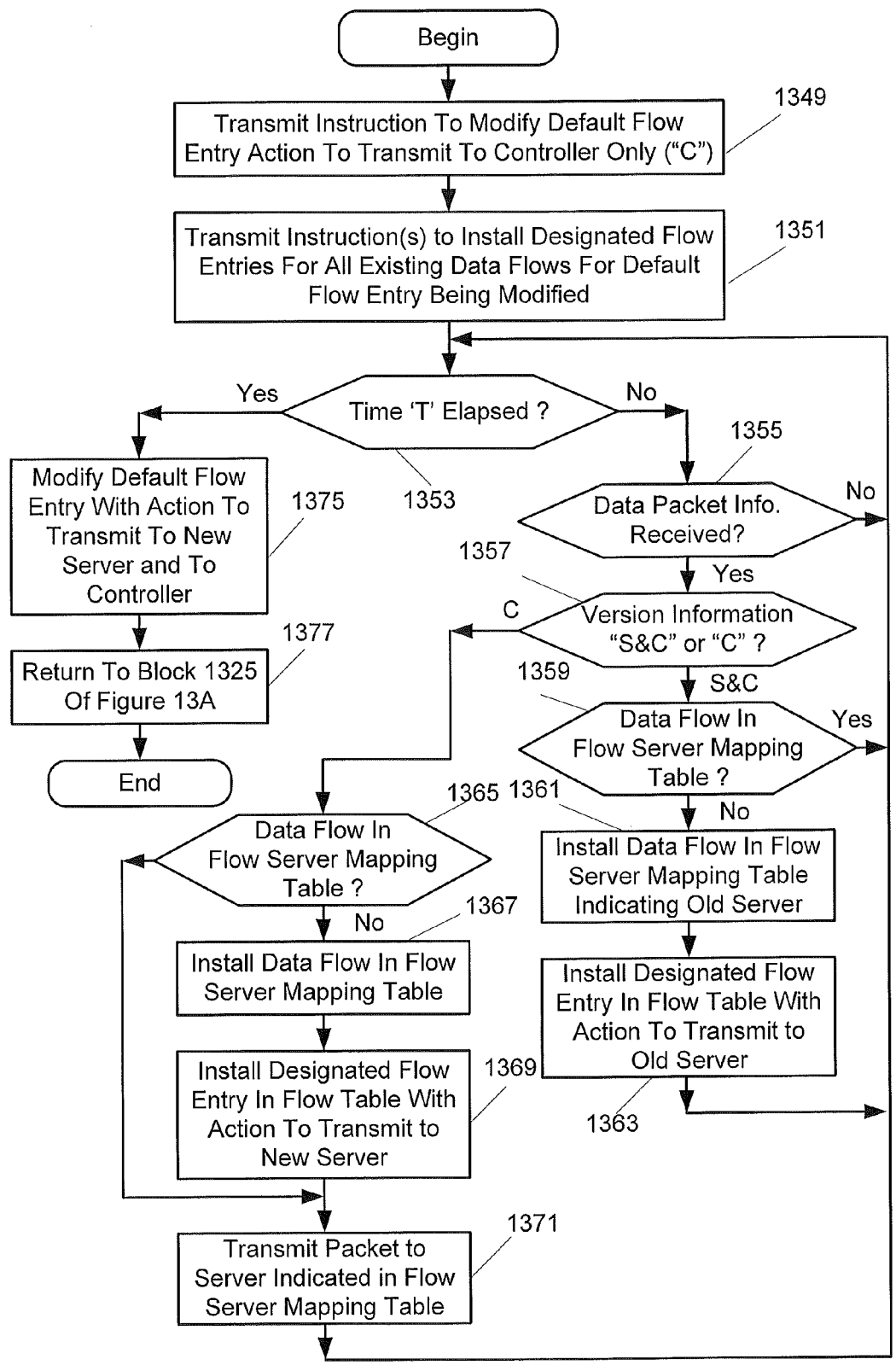

If a default flow entry is to be modified at block 1305, block 1325 may shift to operations of FIG. 13B to change the mapping of the default data flow from an older server S1 to a new server S2. At block 1349, processor 233 may transmit a first instruction through switch interface 237 to switch 211 to modify the default entry from S&C to C to transfer data packet notifications to controller 231 without transmitting the data packets for the default flow entry to an indicated server. At block 1351, processor 233 may search the flow server mapping table to identify all existing data flows being handled by the default flow entry being modified, and processor 233 may transmit instructions through switch interface 237 to install designated flow entries for all such previously existing data flows. These designated flow entries are provided to maintain mappings of the previously existing data flows to the older server before and after modification of the default flow entry.

Transient mode operations may thus be initiated at blocks 1349 and/or 1351, and transient mode operations may be maintained at block 1353 until the time 'T' (a grace period as discussed above) has elapsed. At block 1355, processor 233 may receive information (through interface 237) regarding a data packet received at switch 211 (and this information may be the same as discussed above with respect to block 1307). If the information includes the indication S&C that switch 211 transmitted the data packet to a server at block 1357 and the data flow is not included in the flow server mapping table at block 1359, processor 233 may install the data flow in the flow server mapping table at block 1360, and processor 233 may transmit an instruction (through interface 237) to install a designated flow entry for this data flow in flow table 217a at block 1363. Operations of blocks 1361 and 1363 may be omitted if the data flow is included in the flow server mapping table at block 1361.

If the information includes the indication C that switch 211 did not transmit the data packet to a server at block 1357 and the data flow is not included in the flow server mapping table at block 1365, processor 233 may install the data flow in the flow server mapping table at block 1357, and processor 233 may transmit an instruction (through interface 237) to install a designated flow entry for this data flow in flow table 217a at block 1369. Operations of blocks 1367 and 1369 may be omitted if the data flow is included in the flow server mapping table at block 1365. If the information includes the indication C that switch 211 did not transmit the data packet to a server at block 1357, processor 233 may initiate transmission of the data packet at block 1371. For example, processor 233 may transmit the data packet to the server bypassing switch 211, processor 233 may transmit the data packet through interface 237 and switch 211 to the server, or processor 233 may transmit an instruction through interface 237 to switch 211 for switch 211 to transmit the data packet to the server.

In the above-description of various embodiments of the present inventive concepts, it is to be understood that the terminology used herein is for the purpose of describing particular embodiments only and is not intended to be limiting of inventive concepts. Unless otherwise defined, all terms (including technical and scientific terms) used herein have the same meaning as commonly understood by one of ordinary skill in the art to which the present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of present inventive concepts. All such variations and modifications are intended to be included herein within the scope of present inventive concepts. Accordingly, the above disclosed subject matter is to be considered illustrative, and not restrictive, and the appended claims are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the following claims and their equivalents, and shall not be restricted or limited by the foregoing detailed description and/or by reference numbers included therein which are provided only by way of example. Any reference numbers in the claims are provided only to identify examples of elements and/or operations from embodiments of the figures/specification without limiting the claims to any particular elements, operations, and/or embodiments of any such reference numbers.

That which is claimed is:

1. A method of operating a switch coupled with a plurality of servers and a controller in a load balancing system, the method comprising:
    providing a flow table including a plurality of default flow entries wherein each of the plurality of default flow entries includes a respective match pattern with each of the match patterns of the plurality of default flow entries being different and wherein at least one of the plurality of default flow entries includes the respective match pattern having at least one unrestricted character so that the match pattern having the unrestricted character is satisfied by a plurality of data flow identifications, and wherein each of the plurality of default flow entries includes an action to be performed for data packets having data flow identifications that satisfy the respective match pattern;
    receiving a data packet for a data flow from a client device wherein the data packet includes a data flow identification for the data flow;
    identifying a default flow entry of the plurality of default flow entries having a match pattern that is satisfied by the data flow identification; and
    processing the data packet for the data flow in accordance with the action for the default flow entry having the match pattern that is satisfied by the data flow identification.

2. The method of claim 1 wherein the match pattern that is satisfied by the data flow identification includes an unrestricted character, and wherein the data packet for the data flow is a first data packet for the data flow, the method further comprising:
    after processing the first data packet for the data flow, installing a dedicated flow entry for the data flow in the flow table, wherein the dedicated flow entry includes a match pattern that is specific to the data flow identification of the data flow;
    after installing the dedicated flow entry for the data flow, receiving a second data packet for the data flow from the client device wherein the second data packet for the data flow includes the data flow identification for the data flow;
    identifying the dedicated flow entry having the match pattern that is specific to the data flow identification of the data flow; and
    processing the second data packet of the data flow in accordance with the action for the dedicated flow entry including the match pattern that is specific to the data flow identification for the data flow.

3. The method of claim 2 wherein the data flow is a first data flow, wherein the data flow identification is a first data flow identification, and wherein the client device is a first client device, the method further comprising:
    after processing the second data packet, receiving a data packet for a second data flow from a second client device wherein the data packet for the second data flow includes a second data flow identification for the second data flow, wherein the first and second data flow identifications are different, and wherein the match pattern of the default flow entry that is satisfied by the first data flow identification is also satisfied by the second data flow identification;
    identifying the default flow entry of the plurality of default flow entries having the match pattern that is satisfied by the first and second data flow identifications; and
    processing the data packet for the second data flow in accordance with the action for the default flow entry having the match pattern that is satisfied by the first and second data flow identifications.

4. The method of claim 3 wherein the action for the default flow entry with the match pattern that is satisfied by the first and second data flow identifications is to transmit matching data packets to one of the plurality of servers that is identified by the default flow entry, and wherein the action for the dedicated flow entry is to transmit matching data packets to the one of the plurality of servers identified by the dedicated flow entry, wherein processing the first data packet of the first data flow comprises transmitting the first data packet of the first data flow to the server identified by the default flow entry according to the action for the default flow entry, wherein processing the second data packet of the first data flow comprises transmitting the second data packet of the first data flow to the server identified by the dedicated flow entry according to the action for the dedicated flow entry, and wherein processing the data packet of the second data flow comprises transmitting the data packet of the second data flow to the server identified by the default flow entry according to the action for the default flow entry.

5. The method of claim 4 wherein the default flow entry and the dedicated flow entry identify the same server so that the first and second data packets of the first data flow and the data packet of the second data flow are transmitted to the same server.

6. The method of claim 4 wherein processing the first data packet of the first data flow further comprises transmitting at least the first data flow identification to the controller, wherein processing the second data packet of the first data flow comprises transmitting the second data packet to the server without transmitting the first data flow identification to the controller, and wherein processing the data packet for the second data flow comprises transmitting at least the second data flow identification to the controller.

7. The method of claim 1 wherein the action for the default flow entry is to transmit data packets to a server identified by the default flow entry and to transmit at least a data flow identification to the controller, and wherein processing the data packet for the data flow comprises transmitting the data packet to the server identified by the default flow entry and transmitting at least the data flow identification for the data flow to the controller.

8. The method of claim 7 wherein the data packet for the data flow comprises a first data packet for the data flow, the method further comprising:

after processing the first data packet for the data flow, modifying the default flow entry so that the action for the default flow entry is to transmit at least a data flow identification to the controller without transmitting a data packet to a server;

after modifying the default flow entry, receiving a second data packet for the data flow from the client device wherein the second data packet for the data flow includes the data flow identification for the data flow;

identifying the default flow entry of the plurality of default flow entries having the match pattern that is satisfied by the data flow identification;

transmitting at least the data flow identification from the second data packet of the data flow to the controller without transmitting the data packet to a server.

9. The method of claim 7 wherein the data flow is a first data flow, wherein the data flow identification is a first data flow identification, wherein the client device is a first client device, and wherein the server identified by the default flow entry is a first server identified by the default flow entry, the method further comprising:

after transmitting at least the data flow identification from the second data packet, modifying the default flow entry to identify a second server different than the first server so that the action for the default flow entry is to transmit data packets to the second server identified by the default flow entry and to transmit at least a data flow identification to the controller;

after modifying the default flow entry to identify the second server, receiving a data packet for a second data flow including a second data flow identification for the second data flow, wherein the first and second data flow identifications are different, and wherein the match pattern of the default flow entry that is satisfied by the first and data flow identification is also satisfied by the second default flow identification;

identifying the default flow entry of the plurality of default flow entries having the match pattern that is satisfied by the first and second data flow identification; and processing the data packet of the second data flow in accordance with the action for the default flow entry so that the data packet is transmitted to the second server and so that at least the second data flow identification is transmitted to the controller.

10. The method of claim 9 wherein processing the data packet of the second data flow further comprises transmitting an indication to the controller that the data packet of the second data flow was transmitted by the switch to the second server.

11. The method of claim 1 wherein processing the data packet of the data flow comprises transmitting the data packet of the data flow to a server identified by the default flow entry.

12. The method of claim 11 wherein processing the data packet of the data flow further comprises transmitting at least the data flow identification to the controller.

13. The method of claim 1 wherein the data flow identification includes an Internet Protocol (IP) source address.

14. A load balancing switch comprising:

a controller interface configured to provide communications with a load balancing controller;

a server interface configured to provide communications with a plurality of servers;

a network interface configured to provide communications with a plurality of client devices over a network;

a memory configured to provide a flow table including a plurality of default flow entries wherein each of the plurality of default flow entries includes a respective match pattern with each of the match patterns of the plurality of default flow entries being different and wherein at least one of the plurality of default flow entries includes the respective match pattern having at least one unrestricted character so that the match pattern having the unrestricted character is satisfied by a plurality of data flow identifications, and wherein each of the plurality of default flow entries includes an action to be performed for data packets with data flow identifications that satisfy the respective match pattern; and a switch processor coupled to the controller interface, the server interface, the network interface, and the memory, the processor being configured to, receive a data packet for a data flow from a client device through network interface wherein the data packet includes a data flow identification for the data flow, identify a default flow entry of the plurality of default flow entries having a match pattern that is satisfied by the data flow identification, and process the data packet for the data flow in accordance with the action for the default flow entry having the match pattern that is satisfied by the data flow identification wherein the action includes at least one of transmitting the data packet through the server interface to one of the plurality of servers identified by the default flow entry and/or transmitting at least the data flow identification through the controller interface to the controller.

15. A method of operating a controller coupled with a switch in a load balancing system, wherein the switch provides a flow table to define processing for received data packets, the method comprising:
transmitting at least one instruction to install a plurality of default flow entries in the flow table at the switch wherein each of the plurality of default flow entries includes a respective match pattern with each of the match patterns of the plurality of default flow entries being different and wherein at least one of the plurality of default flow entries includes a respective match pattern having at least one unrestricted character so that the match pattern having the unrestricted character is satisfied by a plurality of data flow identifications, and wherein each of the plurality of default flow entries includes an action to be performed for data packets having data flow identifications that satisfy the respective match pattern;
receiving a data flow identification from the switch together with an indication that an associated data packet was transmitted by the switch to a server, an identification of the server, and an identification of the default flow entry used to process the data packet; and
adding an entry for the data flow to a flow server mapping table so that the entry for the data flow includes the data flow identification, the identification of the server, and the match pattern of the default flow entry used to process the data packet.

16. The method of claim 15 wherein the default flow entry used to process the data packet includes an unrestricted character, and wherein the data flow identification is a first data flow identification, the method further comprising:
after receiving the first data flow identification and adding the entry for the data flow to the flow server mapping table, transmitting an instruction to install a dedicated flow entry for the data flow in the flow table at the switch, wherein the dedicated flow entry includes a match pattern that is specific to the data flow identification of the data flow and the identification of the server.

17. The method of claim 16 wherein the dedicated flow entry includes an indication to transmit matching data packets to the server without transmitting the data flow identification to the controller.

18. The method of claim 17 further comprising:
after receiving the first data flow identification and adding the entry for the data flow to the flow server mapping table, transmitting an instruction to modify the default flow entry to transmit data flow identifications for matching data packets to the controller without transmitting matching data packets to a server while maintaining a first server identification for the default flow entry.

19. The method of claim 18, the method further comprising:
after transmitting the instruction to install the dedicated flow entry for the data flow and after transmitting the instruction to modify the default flow entry, receiving the data flow identification from the switch together with an indication that an associated data packet was not transmitted by the switch to a server; and
initiating transmission of the associated data packet to the server responsive to the entry for the data flow corresponding to the data flow identification being included in the flow server mapping table.

20. The method of claim 18 wherein the data flow identification is a first data flow identification, the method further comprising:
after transmitting the instruction to install the dedicated flow entry for the data flow and after transmitting the instruction to modify the default flow entry, receiving second data flow identification from the switch together with an indication that an associated data packet was not transmitted by the switch to a server, with the first and second data flow identifications being different;
responsive to the second data flow being omitted from the flow server mapping table, adding an entry for the second data flow to the flow server mapping table so that the entry for the second data flow includes the second data flow identification, the identification of the server, and the match pattern of the default flow entry used to process the data packet;
transmitting an instruction to install a second dedicated flow entry for the second data flow in the flow table at the switch, wherein the second dedicated flow entry includes a match pattern that is specific to the second data flow identification of the second data flow and the identification of the server; and
initiating transmission of the associated data packet to the server responsive to the entry for the data flow corresponding to the data flow identification being included in the flow server mapping table.

21. The method of claim 18 wherein the data flow identification comprises a first data flow identification, the method further comprising:
after transmitting the instruction to install the dedicated flow entry for the data flow and after transmitting the instruction to modify the default flow entry, receiving a second data flow identification from the switch together with an indication that an associated data packet was transmitted by the switch to a server, wherein the first and second data flow identifications are different;
responsive to the second data flow being omitted from the flow server mapping table, adding an entry for the second data flow to the flow server mapping table so that the entry for the second data flow includes the second data flow identification, the identification of the server, and the match pattern of the default flow entry used to process the data packet; and
transmitting an instruction to install a second dedicated flow entry for the second data flow in the flow table at the switch, wherein the second dedicated flow entry includes a match pattern that is specific to the second data flow identification of the second data flow and the identification of the server.

22. The method of claim 18 wherein the instruction to modify the default flow entry is a first instruction to modify the default flow entry, the method further comprising:
after transmitting the first instruction to modify the default flow entry, transmitting a second instruction to modify the default flow entry to provide a second server identification for a second server different than the first server identification and to transmit matching data packets to the second server and to transmit a data flow identification for the matching data packets to the controller.

23. A load balancing controller comprising:
a switch interface configured to provide communications with a load balancing switch including a flow table to define processing for received data packets;
a memory configured to provide a flow server mapping table; and a processor coupled to the switch interface and the memory, wherein the processor is configured to,
- transmit at least one instruction through the switch interface to install a plurality of default flow entries in the flow table at the switch wherein each of the plurality of default flow entries includes a respective match pattern with each of the match patterns of the plurality of default flow entries being different and wherein at least one of the plurality of default flow entries includes the respective match pattern having at least one unrestricted character so that the match pattern having the unrestricted character is satisfied by a plurality of data flow identifications, and wherein each of the plurality of default flow entries includes an action to be performed for data packets having data flow identifications that satisfy the respective match pattern,
- receive a data flow identification from the switch together with an indication that an associated data packet was transmitted by the switch to a server, an identification of the server, and an identification of the default flow entry used to process the data packet, and
- add an entry for the data flow to a flow server mapping table so that the entry for the data flow includes the data flow identification, the identification of the server, and the match pattern of the default flow entry.

* * * * *

UNITED STATES PATENT AND TRADEMARK OFFICE
CERTIFICATE OF CORRECTION

PATENT NO.       : 9,118,571 B2                                   Page 1 of 1
APPLICATION NO.  : 13/936745
DATED            : August 25, 2015
INVENTOR(S)      : Bisht et al.

It is certified that error appears in the above-identified patent and that said Letters Patent is hereby corrected as shown below:

In the Specification

In Column 13, Line 45, delete ""5")." and insert -- "S"). --, therefor.

In the Claims

In Column 32, Line 10, in Claim 9, delete "and data" and insert -- data --, therefor.

Signed and Sealed this
Nineteenth Day of January, 2016

Michelle K. Lee
*Director of the United States Patent and Trademark Office*